United States Patent
Hoiles et al.

(10) Patent No.: US 10,057,367 B2
(45) Date of Patent: Aug. 21, 2018

(54) SYSTEMS AND METHODS FOR DATA CACHING IN A COMMUNICATIONS NETWORK

(71) Applicants: William August Hoiles, West Vancouver (CA); Omid Namvar Gharehshiran, Toronto (CA); Vikram Krishnamurthy, Vancouver (CA); Ngoc-Dung Dao, Ottawa (CA)

(72) Inventors: William August Hoiles, West Vancouver (CA); Omid Namvar Gharehshiran, Toronto (CA); Vikram Krishnamurthy, Vancouver (CA); Ngoc-Dung Dao, Ottawa (CA)

(73) Assignee: HUAWEI TECHNOLOGIES CANADA CO., LTD., Kanata (CA)

( * ) Notice: Subject to any disclaimer, the term of this patent is extended or adjusted under 35 U.S.C. 154(b) by 132 days.

(21) Appl. No.: 15/059,013

(22) Filed: Mar. 2, 2016

(65) Prior Publication Data

US 2017/0257452 A1 Sep. 7, 2017

(51) Int. Cl.
  G06F 12/08 (2016.01)
  H04L 29/08 (2006.01)
  G06N 3/08 (2006.01)
  G06F 12/084 (2016.01)

(52) U.S. Cl.
  CPC ........ *H04L 67/2842* (2013.01); *G06F 12/084* (2013.01); *G06N 3/08* (2013.01); *G06F 2212/60* (2013.01)

(58) Field of Classification Search
  None
  See application file for complete search history.

(56) References Cited

U.S. PATENT DOCUMENTS

| 6,163,773 A * | 12/2000 | Kishi | G06F 12/121 706/16 |
| 2010/0312861 A1* | 12/2010 | Kolhi | H04L 67/28 709/219 |
| 2012/0158740 A1* | 6/2012 | Smola | G06F 17/30902 707/748 |
| 2017/0161477 A1* | 6/2017 | Liu | G06F 21/36 |

OTHER PUBLICATIONS

University of Maryland. Introduction to Caches. 2003. Available at: https://www.cs.umd.edu/class/sum2003/cmsc311/Notes/Memory/introCache.html (Year: 2003).*
Hoiles, William August et al. U.S. Appl. No. 14/967,807, filed Dec. 14, 2015, and titled "Method and Apparatus for Data Caching in a Communications Network", not yet published.

(Continued)

*Primary Examiner* — Ryan Bertram

(57) ABSTRACT

A method for managing a cache memory network is disclosed. The method comprises estimating the popularity of a piece of data content according to an extreme learning machine, and managing the cache memory network according to the estimated popularity of the piece of data content. Estimation may be performed upon a request for the piece of data content, and may be accordingly cashed into an appropriate cache memory device upon estimation of its popularity.

22 Claims, 15 Drawing Sheets

(56) References Cited

OTHER PUBLICATIONS

Bastug, Ejder, Bennis, Mehdi and Debbah, Mérouane. Anticipatory Caching in Small Cell Networks: A Transfer Learning Approach. 1st KuVS Workshop on Anticipatory Networks, Sep. 2014, Stuttgart, Germany.

Benoit, F., Heeswijk, M., Miche, Y., Verleysen, M. and Lendasse, A. Feature selection for nonlinear models with extreme learning machines, Neurocomputing, vol. 102, pp. 111-124, 2013.

Huang, G., Zhu, Q., and Stew, C., Extreme learning machine: theory and applications, Neurocomputing, vol. 70, No. 1, pp. 489-501, 2006.

Fang, C., Huang, F. R., Yu, T., Liu, J., and Liu, Y. A distributed energy-efficient algorithm in green content-centric networks, in Communications (ICC), 2015 IEEE International Conference on. IEEE, 2015, pp. 5546-5551.

Borst, S., Gupt, V. and Walid, A. Distributed caching algorithms for content distribution networks, in INFOCOM, 2010 Proceedings IEEE. IEEE, 2010.

Huang, Q , Birman, K., Van Renesse, R., Lloyd, W., Kumar, S., and Li, H. C., An analysis of facebook photo caching, in Proceedings of the Twenty-Fourth ACM Symposium on Operating Systems Principles. ACM, 2013, pp. 167-181.

Huang, G., Huang, G., Song, S. and You, K., Trends in extreme learning machines: A review, Neural Networks, vol. 61, pp. 32-48, 2015.

William Hoiles, Omid Namvar Gharehshiran, Vikram Krishnamurthy, Fellow, IEEE, Ngoc Dung Dao, and Hang Zhang, IEEE Transactions on Cognitive Communications and Networking Adaptive Caching in the YouTube Content Distribution Network: A Revealed Preference Game-Theoretic Learning Approach.

\* cited by examiner

US 10,057,367 B2

SYSTEMS AND METHODS FOR DATA CACHING IN A COMMUNICATIONS NETWORK

CROSS-REFERENCE TO RELATED APPLICATIONS

This application is related to U.S. application Ser. No. 14/967,807, filed on Dec. 14, 2015, and titled "Method and Apparatus for Data Caching in a Communications Network", the entire disclosure of which is hereby incorporated by reference.

FIELD OF THE INVENTION

The present invention pertains to the field of network communications, and in particular to systems and methods data caching in a communications network.

BACKGROUND

Network caching generally refers to the storage of commonly accessed data content such as web pages, audio/video content, and images within a communications network. When a user on a user device requests a specific piece of data content for example, it may be delivered from an originating server to the user device via the communications network. In some situations, the piece of data content may also be stored within a cache memory (e.g. "cached") of the communications network where it may be later retrieved, instead of from the originating server, in the event of a subsequent request for the data content. Accordingly, 'caching' certain pieces of data content may provide faster delivery and reduce data traffic within the communications network. However, cache memories have limited storage space in order to provide cost-effectiveness, making efficient management and use of the cache memories a challenging task.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an improved method and apparatus for data caching in a communications network. In accordance with embodiments of the present invention, there is provided a method for managing a cache memory network. The method comprising: estimating the popularity of a piece of data content according to an extreme learning machine; and managing the cache memory network according to the estimated popularity of the piece of data content.

The extreme learning machine may comprise the steps of: collecting metadata associated with piece of data content; computing the collected metadata; selecting one or more features from the computed metadata; and training an extreme learning machine according to selected one or more features, wherein the popularity of a piece of data content is estimated according to the trained extreme learning machine.

In accordance with embodiments of the present invention, there is provided a management device for managing a cache memory network. The management device comprising: a processor; an output interface coupled to the processor, the output interface for communicatively coupling to the cache memory network; and a memory coupled to the processor and having stored thereon machine readable code which when executed by the processor estimates the popularity of a piece of data content according to operation of an extreme learning machine, and manages the cache memory network according to the estimated popularity of the piece of data content In accordance with embodiments of the present invention, there is provided a computer readable memory having recorded thereon statements and instructions for execution by a computer. The statements and instructions comprising: estimating the popularity of a piece of data content according to an extreme learning machine; and managing a cache memory network according to the estimated popularity of the piece of data content.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
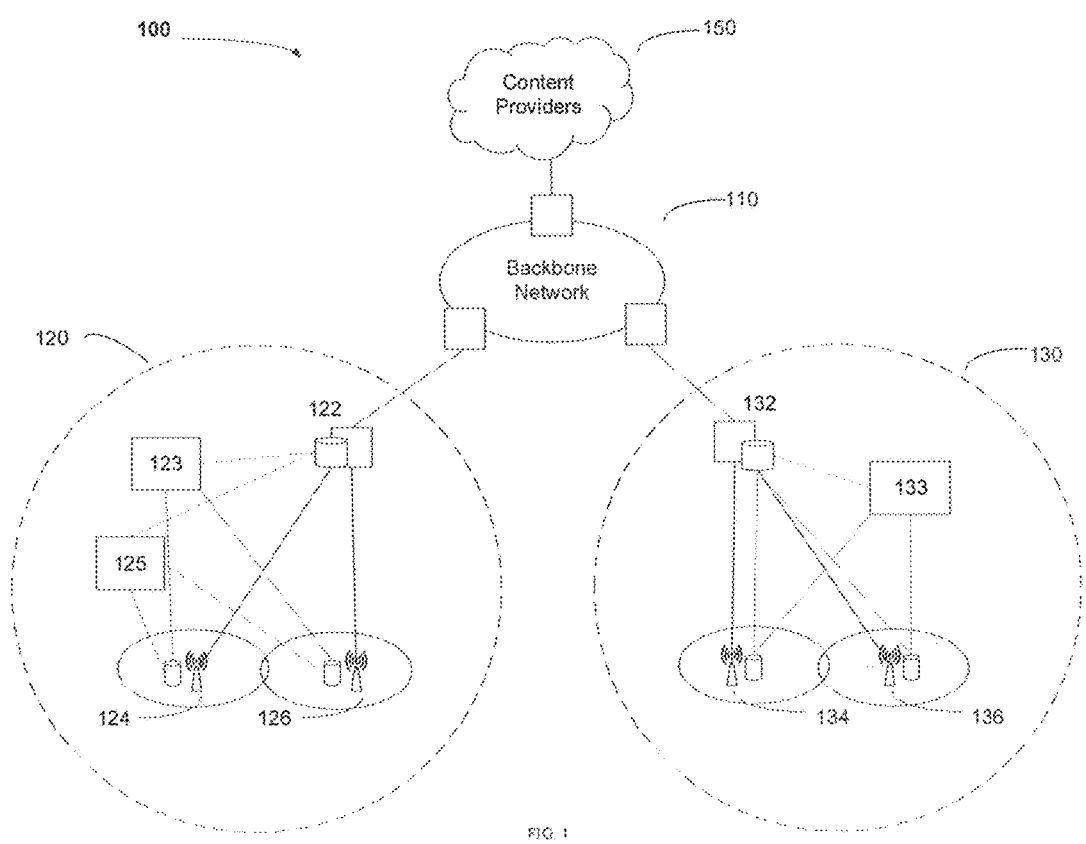
FIG. 1 is a schematic diagram of a communications network including cache memories deployed at various nodes, according to an embodiment.

Communications networks typically include a plurality of servers and nodes that are communicatively interconnected to serve the requests of various users connected to the network via user devices (i.e. user equipment (UEs)). One or more cache memories may be deployed at various locations or nodes of the communications network in order to temporarily and locally store frequently accessed data content, which may then be re-used in a subsequent request without requiring retransmission from the original source location (i.e. "caching"). A "cache hit" may be defined as a request from a user device for a specific piece of data content that is found within a cache memory of the communications network, whereas a "cache miss" may be defined as the absence of a requested piece of data content within the communications network, which must then be retrieved from an originating content provider in order to fulfil the request.

Some benefits of efficient caching include the reduction of bandwidth consumption over the communications network, reduction of request processing over the network, and reduction of latency times required for fetching desired data content (i.e. content retrieval). Unfortunately, cache memories are typically size-limited due to their cost, requiring efficient management of data content within the cache to be effective. This becomes a particularly difficult as the size of the communications network, and the number of UEs connected to the network increases.

In communications networks having a plurality of cache memories, another problem involves the effective organization of data content amongst the cache memories. For example, a set of data content may be divided into different groups (for example, videos, news, music, etc. . . . ), with each specific group of data content being initially cached at a specific geographical location which may reduce distance and transmission latency to a user devices which may request the data content. However, since the popularity of individual or groups of data content may be location and time dependent, the ideal storage location of the data content may also change over time, resulting in an increasing number of cache misses.

Another shortcoming of some communications networks is the failure to utilize and leverage various caching statistics in order to cache, manage, and organize data content within various locations of the communications network. This results in static or semi-static caching operation that fails to adapt to potentially changing and evolving storage conditions of the communications network.

Yet another shortcoming of some communications networks is the failure to communicate or coordinate caching information between various cache memories. This may result in redundant storage of data content, increased latency deliver times, and an increasing number of cache misses.

Embodiments of the present invention are directed towards systems and methods for adaptive and predictive caching in communications networks, that at least partially addresses or alleviates one or more of the aforementioned problems.

FIG. 1 is a schematic diagram of a communications network 100, according to an embodiment of the present invention. The communications network 100 comprises a backbone network 110 communicatively coupled to a first regional network 120 serving a first geographical region, and a second regional network 130 serving a second geographical region. The backbone network 110 and regional networks 120, 130 further comprise a plurality of individual nodes, as shown. For example, regional nodes 122, 132 may comprise routers and/or servers having cache memories, while access nodes 124, 126, 134, 136 may comprise Radio Access Nodes (RAN), base stations, eNodeB's, transceivers, and/or antennas also having cache memories, for example. One or more UEs (not shown) may be communicatively coupled to any of the access nodes 124, 126, 134, 136 in order to receive or transmit data content from the communications network 100, for example via wireless interface. Content Providers 150 are communicatively coupled to the backbone network 110 to provide data content to UEs upon request via the backbone network 110, regional nodes 122, 132 and access nodes 124, 126, 134, 136.

The first regional network 120 further comprises a first network manager 123 communicatively coupled to each of the first regional node 122, and access nodes 124, 126, to manage network operations in the first geographical region, and a centralized content catalog server (CCCS) 125 communicatively coupled to respective cache memories of the regional node 122, and access nodes 124, 126, to catalogue, organize and (centrally) manage cache memory operations.

The second regional network 130 further comprises a second network manager 133 communicatively coupled to each of the second regional node 132, and access nodes 134, 136, to manage local network operations in the second geographical region. In contrast to the first regional network, cache memories of the second regional node 132, and access nodes 134, 136 are communicatively inter-coupled to share cache catalog/library information, and/or cooperatively perform cache memory operations.

Figure 2:
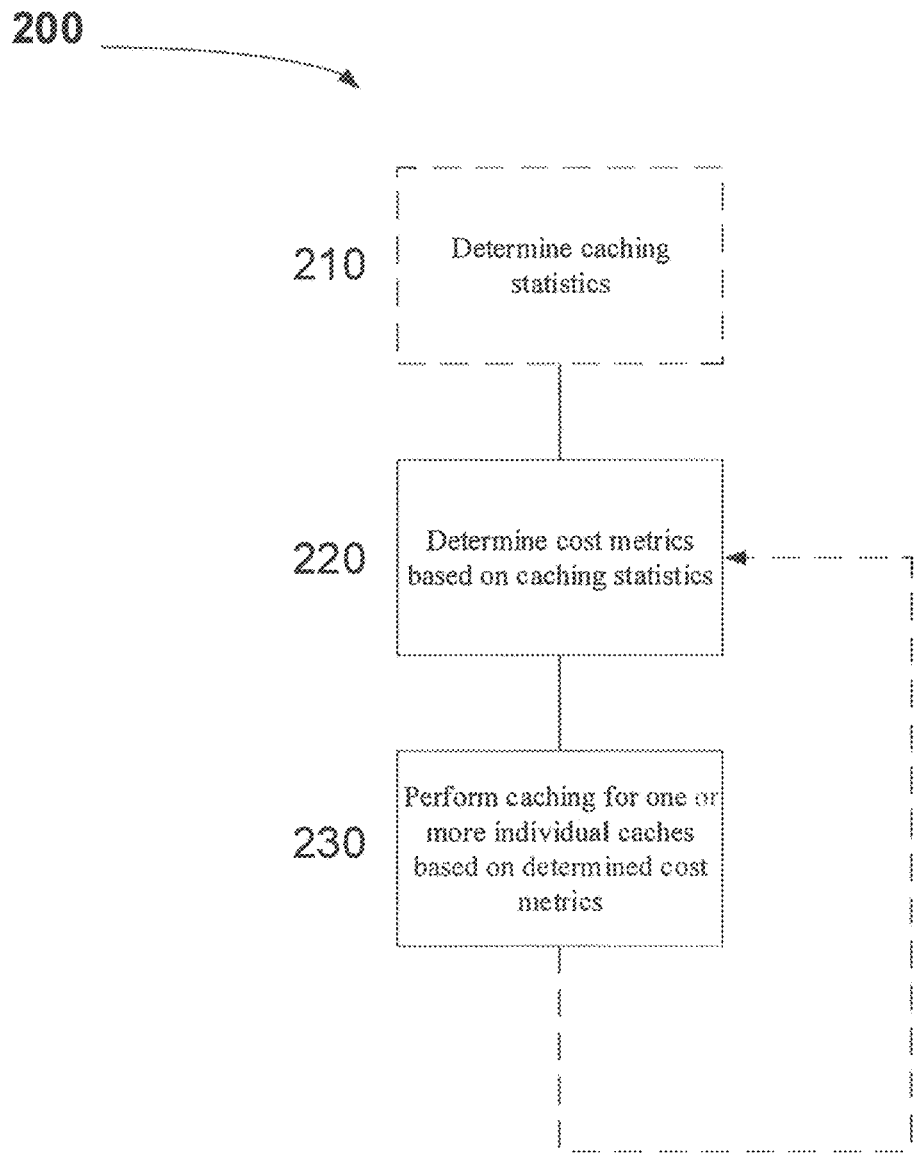
FIG. 2 is a flow chart illustrating a method for adaptive and distributing caching in a communications network, according to an embodiment.

FIG. 2 is a flow chart illustrating an adaptive distributive caching method 200, which may be applied to communications network 100 for example, according to an embodiment. At step 220, cost metrics are determined based on caching statistics of the communications network. For example, the cost metric may comprise the distance or latency for a requested piece of data content to arrive to the requesting user device. In some embodiments, the cost metric can be the monetary cost to send a piece of data content, or a certain amount of data, over a certain distance of a link. The cost rate of the link (e.g. dollars per kilobyte per kilometer) may be variable depending on the time of day. The caching statistics may comprise cache hits and/or cache misses arising from requests. For example, a relatively low cost metric for a particular cache hit, may indicate that the associated piece of data content (e.g. the 'requested' data content) is in a suitable location, whereas a relatively high cost metric for a particular cache hit, or a cache miss, may indicate that the associated piece of data content is in a non-ideal location that requires additional time/resources for delivery to the requesting user device.

In certain embodiments, step 220 may involve inter-cache communication regarding data content stored in individual cache locations, such as directly between individual caches, or through a centralized content catalog (such as CCCS 125) to determine the cost metric associated with a particular cache hit or request. For example, determination of the latency for a particular cache hit, may involve communication between various cache memories to determine where within the communications system the associated data content was stored.

At step 230, caching is performed for one or more individual caches based on the determined cost metrics in step 220. For example, if a large number of cache misses are noted for a specific piece of data content, the piece of data content should be fetched and cached within the communications network relatively closer to where the user device request originates. As another example, if the cost metric (such as distance or latency) relating to cache hits for a specific piece of data content is relatively high, the piece of data content can then be moved to a location closer to where one or more requests originate (e.g. at or closer to the access nodes associated with one or more user devices providing the requests) such that the cost metric would be reduced. The caching strategy may be collaborative (based on statistics/actions for all cache memories of the network), or individually by each cache memory (considering only the requests, data content associated with an individual cache memory). The caching strategy may also involve inter-cache communication regarding data content stored in individual cache locations, such as directly between individual caches, or through a centralized content catalog (such as CCCS 125).

In certain embodiments, step 230 may be performed over a pre-determined period according to the type of data content that is generally cached. As an example, for dynamic data content (such as news) the pre-determined period may be shorter (e.g. every 30-60 min) than that compared for static content (Movies and videos) having a longer (e.g. daily/weekly) lifespan and thus probability of continued requests. After the pre-determined period for step 230 has elapsed, the method 200 repeats at step 220, where cost metrics are updated from caching statistics over the previous period. Step 230 can then again be performed using the updated cost metrics. In this way, caching decisions for the communications system can be made in a dynamic matter reflective of prior caching statistics over the communication system, in a way that reduces or minimizes cost metrics. Previous caching statistics (in step 220) are used to determine/update cost metric calculations, which are then dynamically leveraged to influence subsequent caching decisions (step 230) in a way that can reduce cost metrics associated with subsequent user device requests.

In certain embodiments, such as during network initialization or transitional periods, caching statistics may not yet be available to determine cost metrics (step 220). Accordingly, step 210 of obtaining caching statistics may be first performed. This step may include optionally 'loading' the cache memories of the communications network with various data content, and initially caching data content within the communications network based on user device requests, according to a pre-determined initial caching method over an initial period. By way of illustration, if 10,000 videos need to be initially distributed (cached) in a communications network having 10 cache memories (not shown) each cache having a capacity of 1000 videos, 10 groups of 1000 videos may be randomly 'loaded' into each cache memory. The predetermined initial caching method may then be performed until a sufficient amount of caching statistics generated to advance to the next step.

In certain embodiments, the initial caching method that may be used in step 210 can be independently made by individual cache memories. For example, cache memories may use a Least Recently Used (LRU) caching method to generate caching statistics. Alternatively, cache memories may use a pre-defined caching rule, such as caching any requested data content at or nearby the cache locations of the access node associated with the request. As another example, cache memories may pre-fetch certain data content which are likely to be later requested by user devices. In some embodiments, the initial caching method may involve inter-cache communication (for example, of cache catalogs or libraries), such as determining the existence of a requested piece of data content, and whether caching it would cause redundant storage within the network. In some embodiments, the communications network may include a centralized catalog server of the contents of all cache memories, to keep track of cached data content in performance of the initial caching method.

Figure 3:
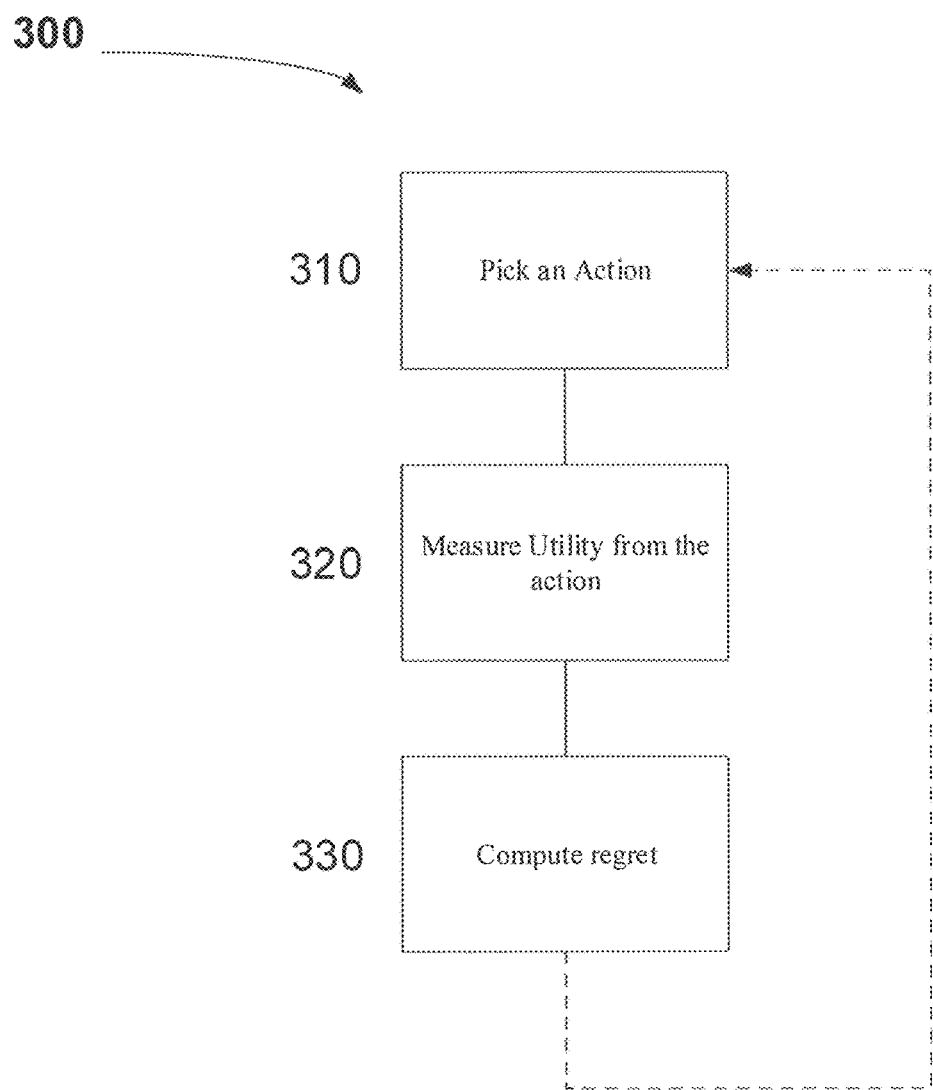
FIG. 3 is a flow chart illustrating a game theoretical learning regret-based algorithm that may be implemented in the method of FIG. 2, according to an embodiment.

FIG. 3 is a flow chart illustrating a game theoretic learning regret-based algorithm (GTLRBA) 300, which for example, may be applied as the caching strategy in step 220 and/or step 230 of the adaptive distributive caching method 200 of FIG. 2. GTLRBA 300 is a class of algorithms that can be applied to individual agents (e.g. cache memories) for optimizing a local utility (e.g. cost metric associated with caching/storage, or delivering data content) in a global system (e.g. communications work) as it converges to sophisticated behaviour towards set of correlated equilibria. For example, each node in communications network 100 may run GTLRBA 300 in a recursive loop, to perform independent caching decisions. Although each node may operate GTLRBAs independently, its collective use may ensure that every cache memory picks an action (e.g. whether to cache a particular piece of data content) from a set of correlated equilibria that improves overall network caching performance.

Referring back to FIG. 3, at step 310, an action is picked, for example by an individual cache memory (or node). For example, the action may be whether the cache memory should store (e.g. cache) or not store a particular piece of data content in response to a request from a user device. The initial action may be random or predetermined, and then after looping (back to step 310 from step 330, as will be explained below), subsequent actions may be based on the 'regret' at a previous time. At step 320, the utility from the action is measured. Utility for example, may comprise a cost, cost metric, latency, storage, distance, etc. . . . , and further depends on the actions taken by other cache memories. For example, if another cache memory performs an action (e.g. it decides to cache a piece of data content), the utility for the subject cache memory considers this. In this way, actions from all cache memories/nodes affect the utility of other nodes. Finally, at step 330, the regret is calculated from the action. Regret considers how much worse off the cache memory would be (in terms of utility) had it picked a different action. In other words, it may consider the utility had the cache memory picked a different action. In some embodiments, the regret computed in step 330 may comprise a regret matrix used to determine a running regret average over time. The currently computed regret, may then be used to influence the action (step 310) of the cache memory at a subsequent time.

In embodiments where each of the cache memories of a communications network independently apply GTLRBA 300, because every cache memory picks an action (step 310) from a strategy with a correlated equilibria (e.g. in a way to minimize regret), overall network operation converges over time to a behaviour that may improve or optimize the given utility (e.g. cost metrics associated with caching data content). In this way, application of the GTLRBA 300 leverages actions made in the past (e.g. caching statistics) to potentially minimize delivery cost metrics for requests made at later times.

Figure 4A:
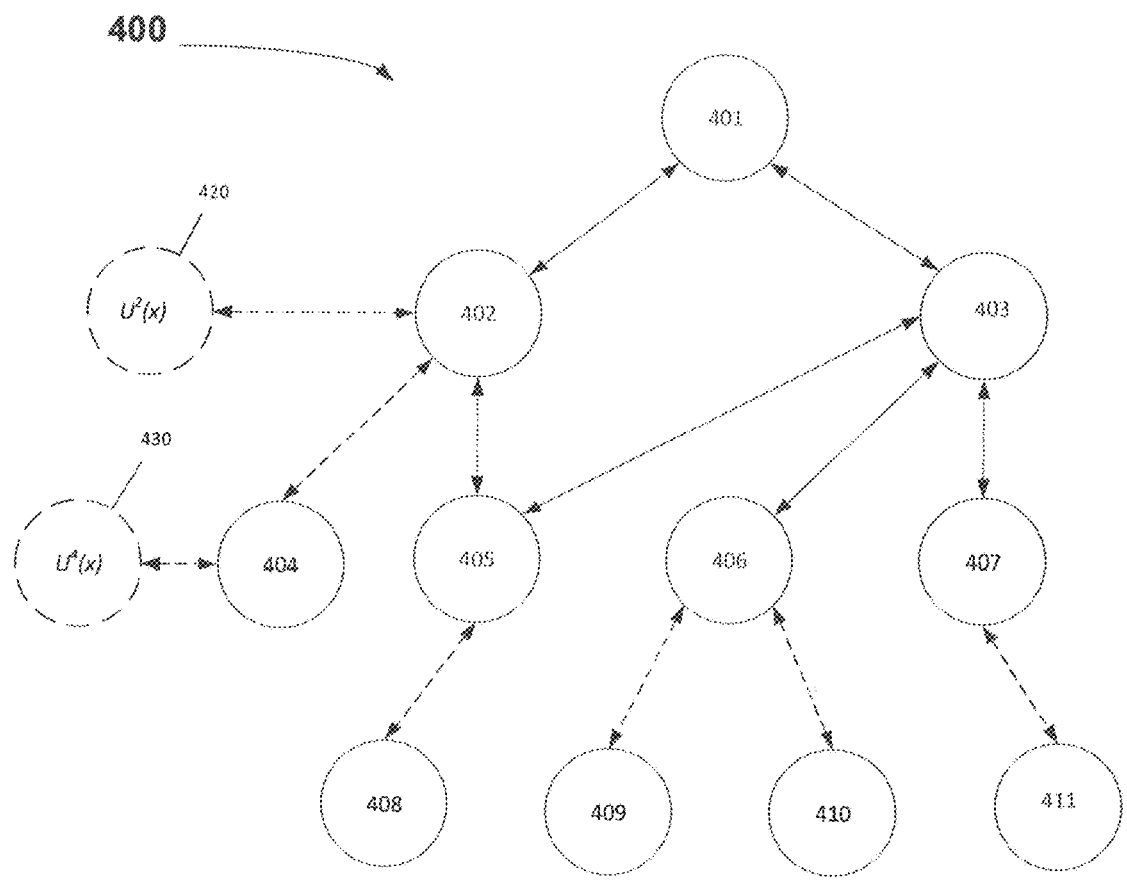
FIG. 4A illustrates an communications network having a cache memory infrastructure, according to an embodiment.

Referring to FIG. 4A, there is shown exemplary communications network topology 400, according to an embodiment. As will be explained through FIGS. 4B-4C below, the communications network topology 400 will be used to compare and simulate cost metrics (ex. average cache hit ratio and average latency) when applying the distributive caching method 200 of FIG. 2, wherein each node applies the GTLRBA 300 of FIG. 3. As shown in FIG. 4A, the communications network topology 400 has a plurality of nodes including a original server 401, and a plurality of edge nodes (402 . . . 411) communicatively inter-coupled to the original server 401 via various links. Each of the links further have different capacities (e.g. bandwidths) associated therewith. For example, the links shown in solid line may be optical links having 10-100 GB/s capacity with 2 ms latency, the links shown in dotted line may be dedicated links having 10-100 MB/s capacity with 21 ms latency, and the links shown in dashed line may be Ethernet links having about 10 MB/s capacity with 33 ms latency. Each of the edge nodes (402 . . . 411) may have various UEs communicatively connected thereto (not shown) which may send various requests for data content. The data content, may be retrieved from the original server 401, or from the various edge nodes (402 . . . 411) if cached therein. Requests from user devices may be facilitated by traffic engineering (TE) functions 420, 430, as shown in FIG. 4A to fetch and deliver requested data content to various UEs. In this embodiment, 12,000 videos, divided into 15 categories of 800 videos, are initially loaded onto edge nodes (402 . . . 411), with each edge node initially storing 2 video categories.

Figure 4B:
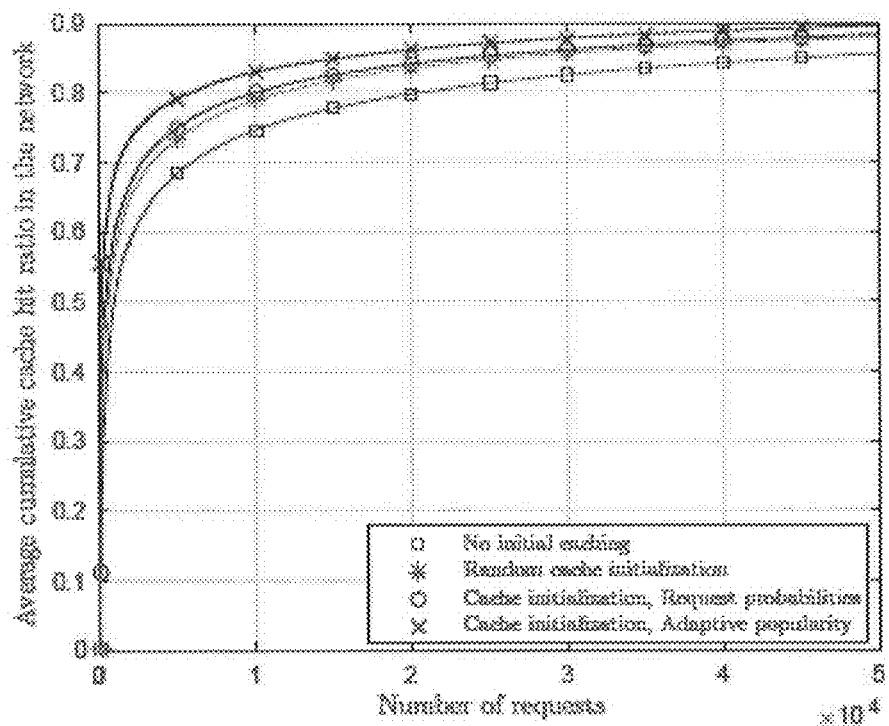
FIGS. 4B-4C are graphs simulating the average cache hit ratio and average latency of the communications network of FIG. 4A, when applying the method illustrated in FIG. 2, according to an embodiment.
Figure 4C:
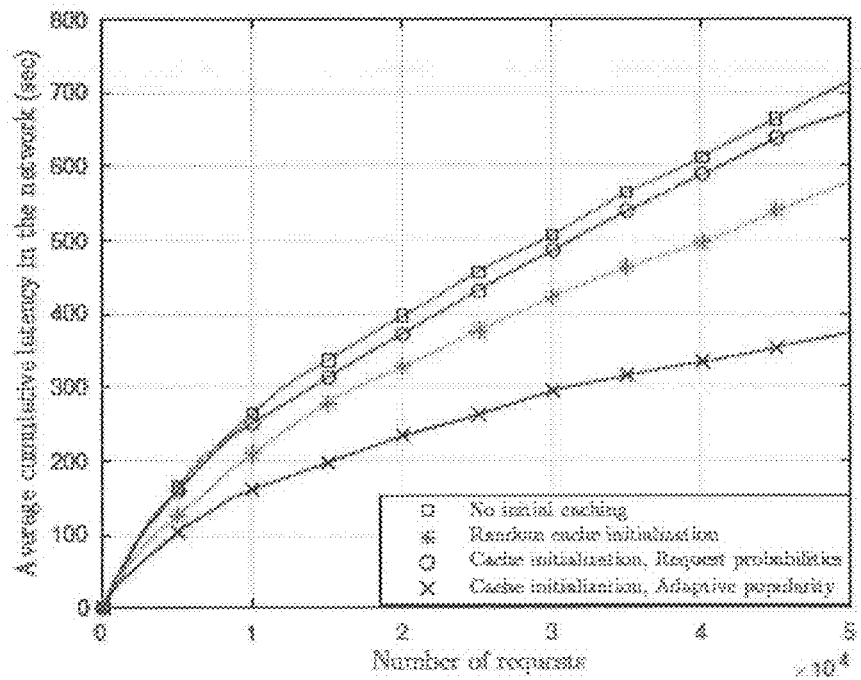

Referring to FIGS. 4B-4C, there are shown exemplary graphs simulating the average cumulative cache hit ratio (FIG. 4B) and average cumulative latency (FIG. 4C) for the communications network topology 400 of FIG. 4A when applying the distributive caching method 200 of FIG. 2, wherein each node applies the GTLRBA 300 of FIG. 3. As shown in FIG. 4B, the average cache hit ratio increases with application of method 200, whereas in FIG. 4C, the average latency is shown to decrease.

Figure 5:
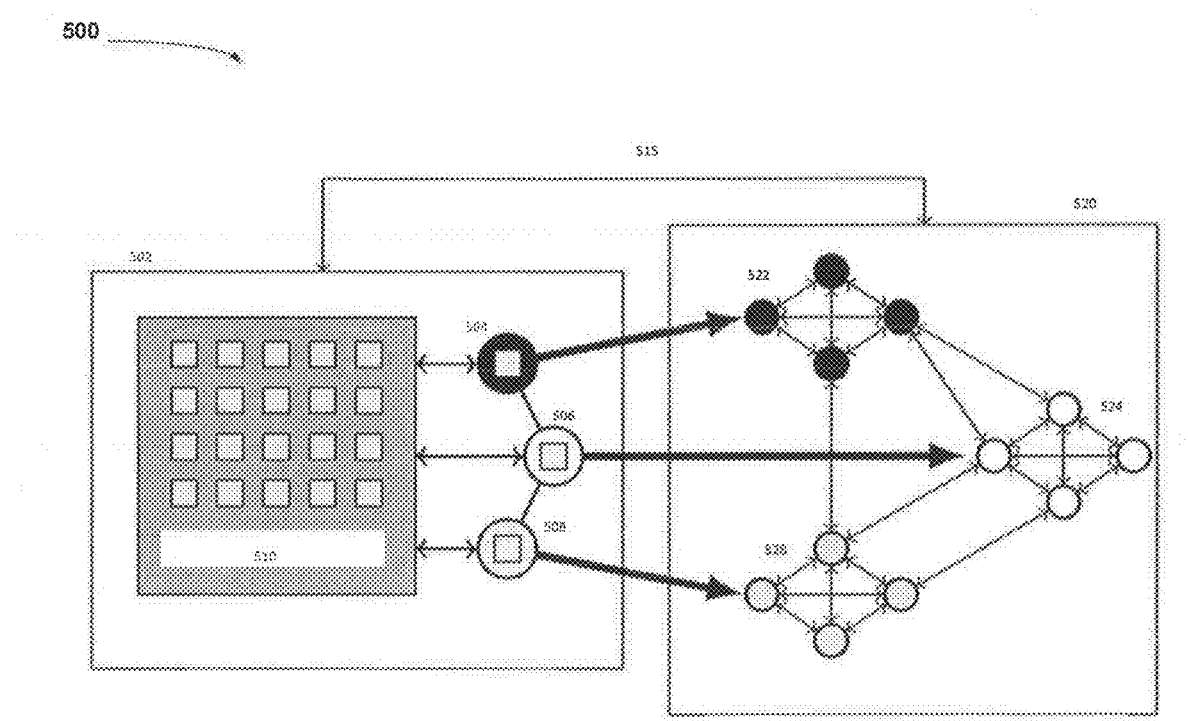
FIG. 5 is a functional diagram of a communications network, illustrating application of game theoretic adaptive caching on a fast timescale, and revealed preferences on a slow timescale, according to an embodiment.

Referring to FIG. 5, there is shown a functional representation of a communications network 500 including a backhaul network 502 communicatively coupled to a social network 520, according to an embodiment. The backhaul network 502 (e.g. a caching infrastructure) includes a host server 510 communicatively coupled to edge servers 504, 506, 508, and operates according to a first function such as an adaptive and distributive caching function (e.g. caching method 200 of FIG. 2 above, for example). The social network 520 includes a plurality of UE clusters 522, 524, 526, and operates according to a second function (e.g. determining request probabilities and/or revealed preferences of users, as will be explained in further detail below, for example). Each of the edge servers 504, 506, 508 are further communicatively coupled to one of the UE clusters 522, 524, 526. In general operation, the backhaul network 502 receives a request 515 for a piece of data content from a user device associated with one of UE clusters 522, 524, 526. Backhaul network 502 retrieves the requested data content from the host server 510, or any of the of the edge servers 504, 506, 508 having the requested data content stored therein, and delivers the requested data content to the user device in accordance with cache management techniques of the first function. The backhaul network 502 may at times, also require certain inputs from the second function operating over the social network 520, in performance of the first function, as will be described in further detail below.

As indicated above, the backhaul network 502 includes a host server 510 which in some embodiments for example, may correspond to the content provider 150 in FIG. 1, whereas edge servers 504, 506, 508 may correspond to access nodes 124, 126, 134, 136 of FIG. 1. The host server 510 and edge servers 504, 506, 508 each include cache memories for storing various data content, wherein the backhaul network 502 is functionally operable to manage respective cache memories according to the first function operable in a fast timescale (for example, in cycles consisting of seconds). According to certain embodiments, the first function may comprise the adaptive and distributive caching method 200 of FIG. 2, or the game theoretic learning regret-based algorithm 300 of FIG. 3 adapted to cache memory management. The first function may at times employ certain inputs from the social network 520 in order to manage respective cache memories. For example, the first function may utilize revealed preferences of users on user devices associated with UE clusters 522, 524, 526 for more effective cache management of the backhaul network 502, as will be described further below.

As also indicated above, the social network 520 is operably configured to perform a second function in order to provide certain inputs to the first function operating over the backhaul network 502. For example, the second function may comprise determination of request probabilities, or a revealed preference function for determining preferred data content of users on user devices associated with UE clusters 522, 524, 526. The request probabilities/revealed preferences may then be provided to the first function, to assist in the determination and execution of an appropriate caching strategy for backhaul network 502. The second function may operate on a slow timescale (for example, minutes, hours, days, etc. . . . ), and in some embodiments, may alternatively be deployed using physical resources of the backhaul network 502 (not shown).

Through concurrent operation of the first function over the backhaul network 502, and the second function over the social network 520, a distributed caching and content distribution method is established that allows for dynamic caching decisions to be made by each edge server 504, 506, 508, in accordance to user preferences as they evolve over time. As indicated above, the first function may comprise an adaptive learning algorithm operating over a fast timescale that accounts for request probabilities and current server load when caching data content. The second function may comprise a revealed preference algorithm operating on a slow time scale that determines the request probabilities from user devices coupled to backhaul network 502. The first and second functions may share certain inputs or data in the execution of their operations. In this way, communications network 500 can operate to cache only popular pieces of data content based on the behavior of various users. Other factors, such as server load and the latency cost incurred by transferring data content between neighboring servers, can also be accounted for. Further, improved cache management can be achieved without the need for a centralized controller or coordinating device.

Figure 6:
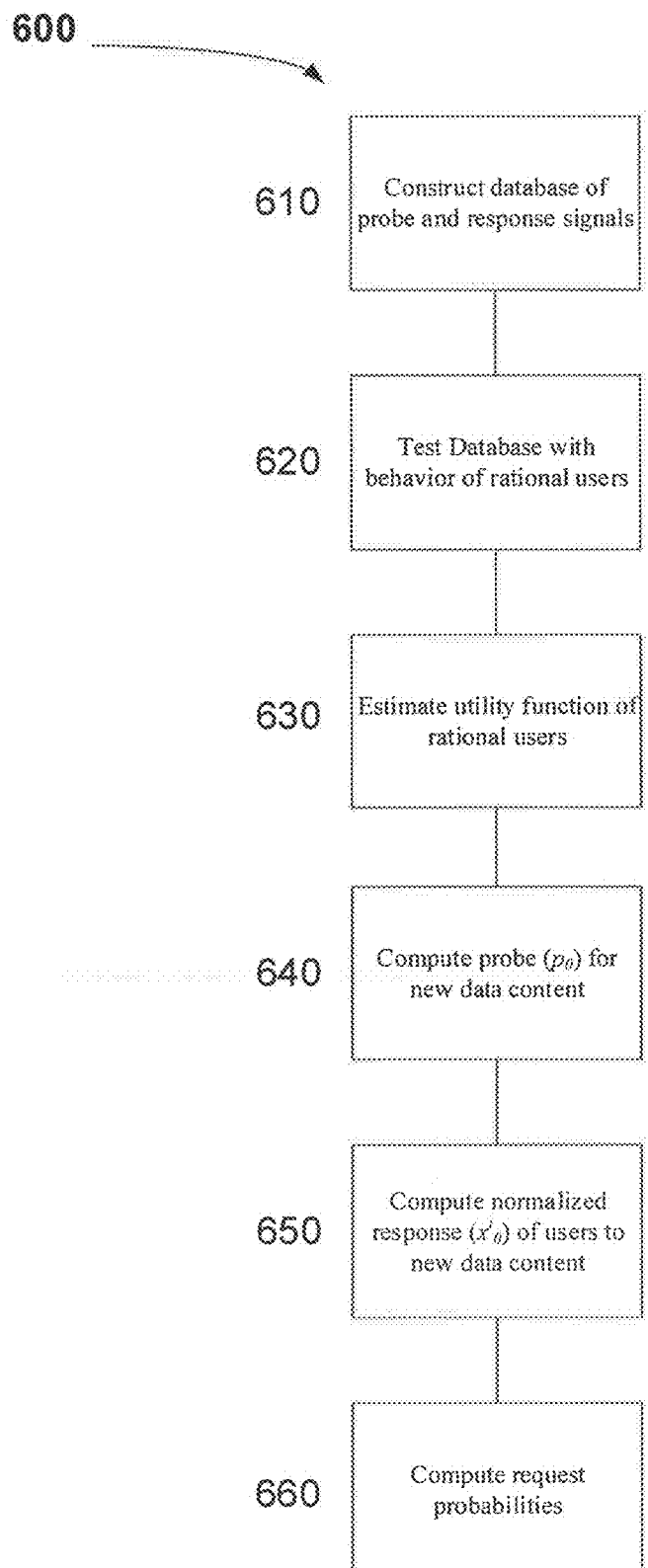
FIG. 6 is a flow chart illustrating a method for determining revealed preferences, according to an embodiment.

Referring to FIG. 6, there is shown a flow chart illustrating a method 600 for determining request probabilities, which may be applied as the second function operable over social network 520 of FIG. 5, for example. At step 610, a database of probe and response signals are constructed. This may be performed for every server (e.g. edge servers 504, 506, 508 of FIG. 5) and used to detect if the user's choices are rational, as will be described later.

In certain embodiments, the probe signal $P_d \in \mathbb{R}^J$ is given by:

$$p_d(j) = \frac{1}{N_j} \sum_{k=1}^{N_j} \frac{1}{\#subscribers\ (k)} \quad (1)$$

and the response signal $x_d^i \in \mathbb{R}^J$ is given by $$x_d^i(j) = \frac{1}{N_j} \sum_{k=1}^{N_j} viewcount(k) \quad (2)$$

where $N_j$ is the total number of pieces of data content in category j, and i denotes the server. The constructed dataset may be given by:

$$\mathcal{D}^i = \{(p_d, x_d^i) : d \in \{1, 2, \ldots, T\}\} \quad (3)$$

At step 620, the dataset is tested to see whether it is consistent with the behaviour of rational users. This step involves performance of a rationality test to see whether any utility function exists. In certain embodiments, rationality may be tested using the following linear program, to see whether it produces a feasible solution:

$$u_\tau^i - u_d^i - \lambda_d^i p_d'(x_\tau^i - x_d^i) \leq 0$$

$$\lambda_d^i > 0 \text{ for } d, \tau \in \{1, 2, \ldots, T\} \quad (4)$$

where $u_\tau$ and $u_d$ are scalars. If user selections are found to be completely random, this indicates irrational behavior, and accordingly, user behavior cannot be predicted.

At step 630, the utility function is estimated for rational users. In certain embodiments, this may be done according to the following:

$$u^i(x) = \min_{d \in \{1,2,\ldots,T\}} \{u_d^i + \lambda_d^i p_d'(x - x_d^i)\}. \quad (5)$$

At step 640, the probe for new data content ($p'_o$) is computed. At step 650, the normalized response ($x_o^i$) of users to new data content is computed. This may be performed by solving the following linear program:

$$\max z \quad (6)$$
$$\text{s.t.} \quad z \leq u_d^i + \lambda_d^i p_o'(x_o^i - y_d^i + \eta_d), d^i \in \{1, \ldots, T\}$$
$$p_o' x_o^i \leq 1, x_o^i \geq 0$$

Finally, at step 660, request probabilities ($\mu_d^i = [\mu_d^i(1), \ldots, \mu_d^i(J)]$) given the normalized response (4) may be determined, for example, by the following:

$$\mu_d^i(j) = \left[1 + \sum 1 \leq \underset{k \neq j}{k} \leq J \frac{x_d^i(j)}{x_d^i(k)}\right]^{-1} \quad (7)$$

Figure 7:
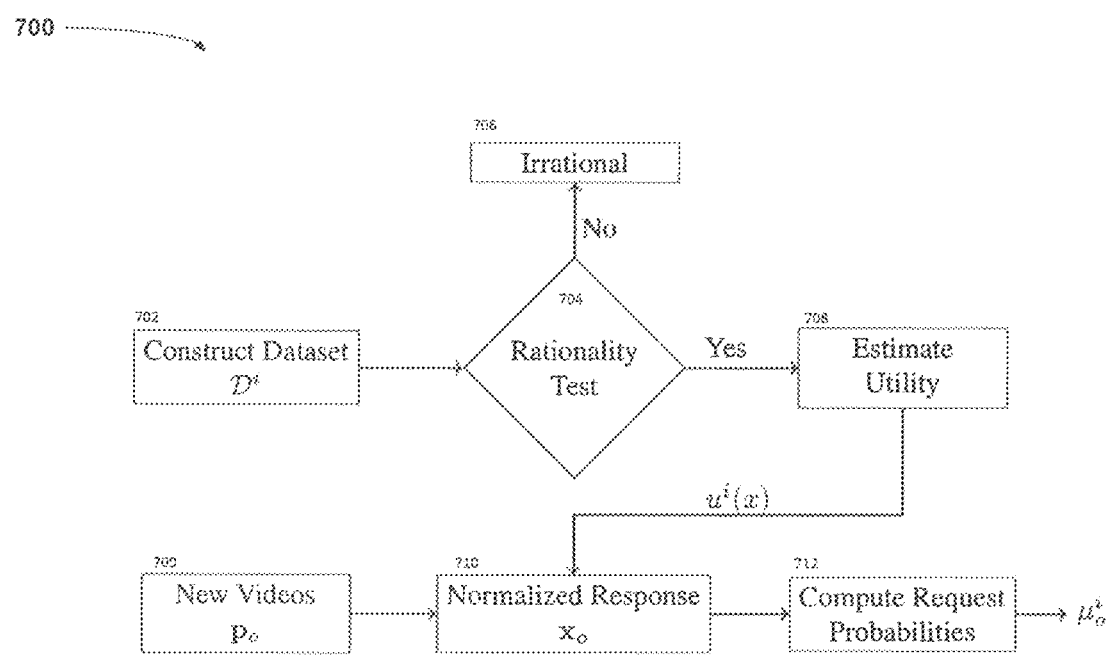
FIG. 7 is a flow chart illustrating a method for computing request probabilities, according to an embodiment.

Referring to FIG. 7, there is shown a decisional flow chart 700 illustrating a method 700 for determining request probabilities, for example, for each server 504, 506, 508 in FIG. 5, and which may be applied as the second function operable over social network 520. The decisional flow chart 700 of FIG. 7 is representative of the method 600 of FIG. 6, and its description is therefore omitted for brevity.

In certain situations, it may be desirable to perform cache management of communications system 100, for example, using the predicted popularity of various data content. For example, data content that is determined to be relatively more popular, can be stored within proximate cache locations of the communications system 100, to reduce latency when delivering the data content to a requesting user device. Data content determined to be relatively less popular, may be purged from the communications system 100, or cached at a relatively more distant cache location from potential user devices. In this way, data content may be efficiently organized within communications system 100 to reduce backhaul load within the network, and to also reduce latency when specific data content is to be delivered to a requesting user devices.

Figure 8:
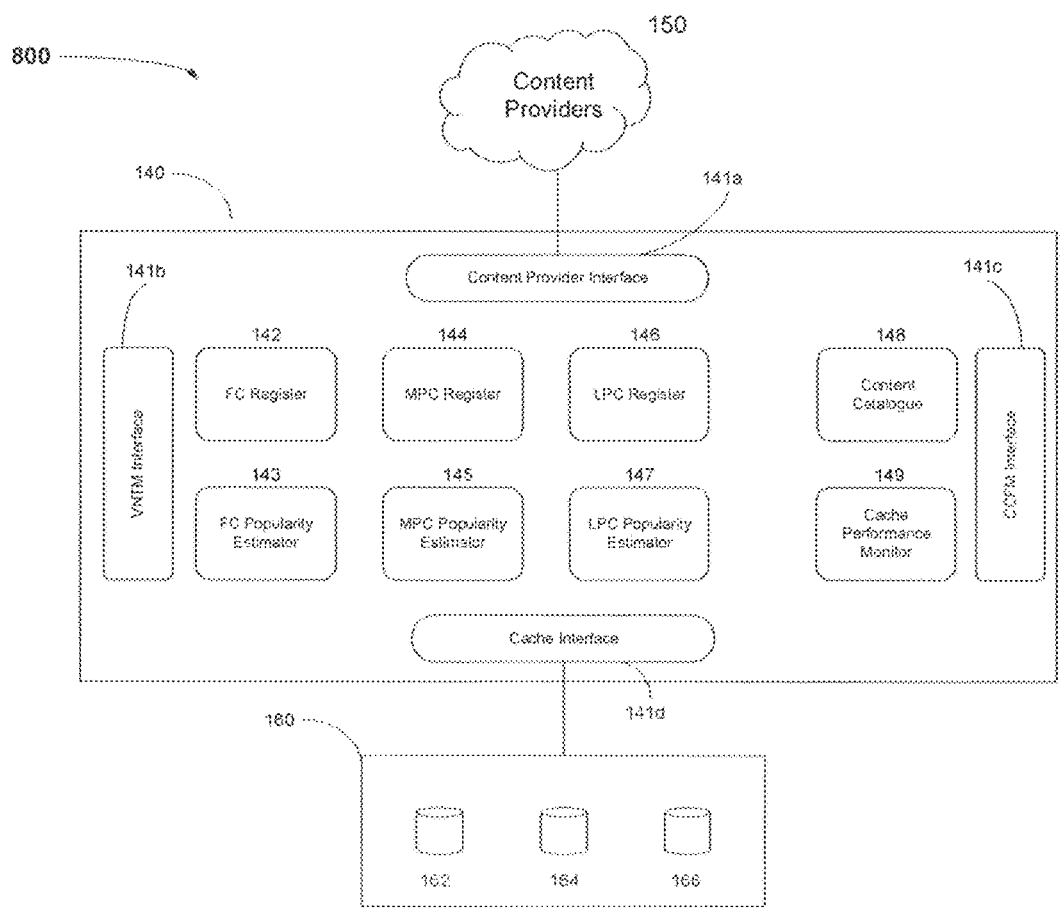
FIG. 8 is a functional diagram of a communications network including a management device for managing a cache memory network, according to an embodiment.

Referring to FIG. 8, there is shown a functional schematic of a communications network 800, according to an embodiment. The communications network 800 includes a management module comprising a Caching, Computing and Forwarding Manager (CCFM) 140 communicatively coupled to a cache memory network 160, for managing the first cache 162, second cache 164, and third cache 166 therein. CCFM 140 is further coupled to content providers 150 for retrieving various data content, for example, in response to a request, or when data content is absent from the cache memory network 160. In certain embodiments, CCFM 140 may correspond to network managers 123, 133, the first cache 162 may correspond to the cache memory at the first regional node 122, the second cache 164 may correspond to the cache memory at access node 124, and the third cache 166 may correspond to the cache memory at access node 126, of FIG. 1 for example.

As shown in FIG. 8, CCFM 140 includes various interface modules 141 including a Content Provider interface 141a, a virtual network topology manager interface 141b, a CCFM interface 141c, and a Cache interface 141d. CCFM 140 further comprises a Fresh Content (FC) register 142, an FC popularity estimator 143, a Most Popular Content (MPC) register 144, an MPC popularity estimator 145, a Least Popular Content (LPC) register 146, a LPC popularity estimator 147, a content catalogue 148, and a cache performance monitor 149. It is noted that the CCFM may also include other functionalities not illustrated.

The CCFM 140 is communicatively coupled via the cache interface 141d to the cache memory network 160 in order to manage storage of data content within each of the first cache 162, second cache 164, and third cache 166. The CCFM 140 also includes various registers which serve as catalogs or indexes for looking up the location of specific data content cached throughout the communications network 800. Each register may belong to a certain category that indexes data content having a certain criteria or characteristic. The registers may each comprise one or more entries (or pointers, references) each identifying the location of a specific piece of data content within individual caches 162, 164, 166. The entries within registers may also be sorted, arranged, or organized according to certain criteria, in order to find data content corresponding to a desired criteria within each register. In this way, various pieces of data content can be individually associated with different registers through various indexes therein.

Referring again to FIG. 8, the content catalogue 148 is a database of all data content stored in individual caches 162, 164, 166 (and potentially other cache networks not shown).

Entries in content catalogue 148 may be labelled for example, by content name, content description, content cache location, content popularity, hit count, miss count, and timer. Hit count is a counter indicating the number of times a particular item of data content has been accessed from a certain cache. Miss count is a counter indicating the number of times an item of data content has been requested but not found in the cache. Hit and miss counts can be kept for items of data content and/or for particular content service providers. Timer may indicate the remaining time in which the data content remains valid. Content popularity is a variable indicating the relative popularity of the data content within a geographical area or region of the network. Content cache location identifies where particular data content is stored within individual caches 162, 164, 166.

The cache performance monitor 149 observes and reports various parameters of individual caches 162, 164, 166. For example, cache performance monitor 149 may monitor the number of hits or misses for a particular content provider, content category (e.g. movie, music, images) and cache location, where a hit may be defined as a specific request for a particular piece of data content located in a certain geographical location (such as cache network 160, or a specific individual cache 162, 164, 166), and a miss defined as a request for a piece of data content item not found in a certain location (such as within the cache network 160). The cache performance monitor 149 can also monitor storage capacity of various caches or content providers, frequency of content replacement within individual caches, and outgoing traffic volume from individual caches.

FC register 142 is an index for newly arrived data content to the cache network 160. For example, new data content may be sent to CCFM 140 in response to a request for the new data content. MPC register 144 is an index for data content that is relatively more popular or accessed at a greater rate. LPC register 146 is an index for data content that is relatively less popular or accessed at a lower rate. As will be discussed and illustrated in further detail below, the use of multiple registers for categorizing and indexing data content in individual caches 162, 164, 166 may improve management and speed in delivering various data content to user devices.

FC popularity estimator 143, MPC popularity estimator 145, and LPC popularity estimator 147 are functional modules that estimate the popularities of data content referenced by entries in the FC register 142, MPC register 144, and LPC register 146, respectively. For example, popularity may be defined by the number of times a particular item of data content has been accessed, or the frequency at which the data content entry has been used or accessed. Alternatively, the popularity of a data content item may be defined based on the amount of time elapsed since that data content item was last accessed. The FC popularity estimator 143, MPC popularity estimator 145, and LPC popularity estimator 147 may comprise different algorithms or processing functions to provide different treatment of statistics for determining popularity for its respective register. Furthermore, popularity estimators 143, 145, 147 can be configured to perform spatio-temporal popularity estimation. For example, popularity estimators 143, 145, 147 can estimate popularity in different geographic locations, network locations, different times of day or week, or the like, or a combination thereof.

According to certain embodiments, popularity estimators 143, 145, 147 may be implemented in a centralized or distributed manner. For example, a FC popularity estimator 143 can operate at a content service provider server (not shown). In this case, when new data content is introduced to the content service provider, the FC popularity estimator 143 estimates popularity of the new data content and attaches meta-information to the data content indicative of estimated popularity.

Interface modules 141 are used by CCFM 140 to communicate with other functional components outside of communications system 800 (not shown). Content Provider interface 141a is communicatively coupled to content provider 150 in order to obtain data content and/or content meta information associated with certain data content (e.g. content type, "time to live", encoding formats, content type, etc. . . . ). Virtual network topology manager (VNTM) interface 141b is communicatively coupled to a virtual network topology manager. For example, the virtual network topology manager is configured to deploy network resources to instantiate the various caches and cache controllers at desired network locations. The caches and cache controllers can be deployed using Network Function Virtualization (NFV), Software Defined Topology (SDT), and/or Software Defined Protocols (SDP). For example, to receive information such as assigned resource usage (of physical cache locations, memory sizes, and computing resources) and user device-cache associations (for example radio node-cache connection matrix information). CCFM interface 141c is communicatively coupled to other CCFM modules (not shown) to exchange various information.

Cache interface 141d is communicatively coupled to individual caches 162, 164, 166 in order for CCFM 140 to manage store, and update data content within the caches. For example, CCFM 140 may send commands to delete unpopular data content, or to copy certain data content to other individual cache(s), and to receive memory usage information (i.e. remaining storage capacity) and requests to move content to another cache (for example, if the individual cache is full or reaches a predetermined level).

Individual caches 162, 164, 166 are cache memories which include cache, computing, and cache forwarding functions. Individual caches 162, 164, 166 are operatively configured to store, delete or copy data content objects in accordance with commands received from the CCFM 140. Individual caches 162, 164, 166 can also perform content processing functions (e.g. coding and transcoding) and report maintenance information to the CCFM 140, such as the available capacity left in each cache.

Figure 9:
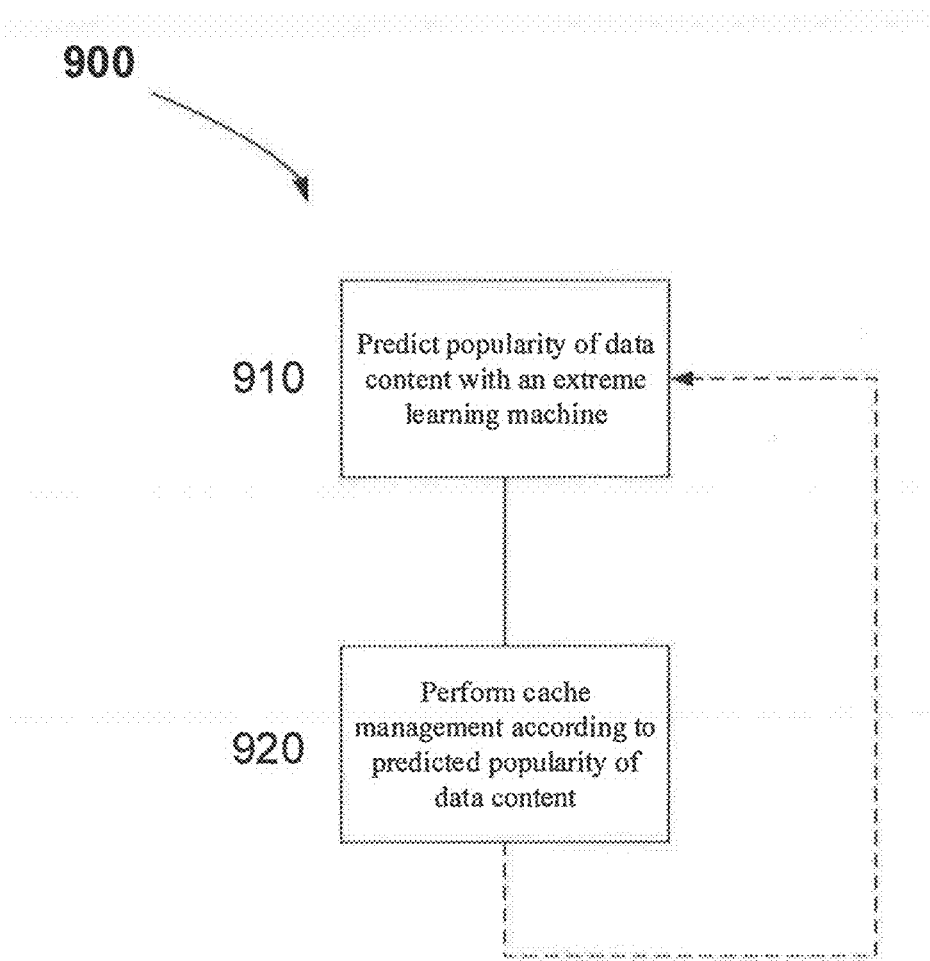
FIG. 9 is a flow chart illustrating a method for managing a cache memory network, according to an embodiment.

Referring to FIG. 9, there is shown a method 900 for managing a cache memory network, such as of a communications network 800 of FIG. 8, according to an embodiment. For example, method 900 may be implemented by CCFM 140 of FIG. 8 to manage cache network 160 based on predicted popularity. At step 910, the popularity of a piece of data content is estimated using an extreme learning machine ("ELM", described in further detail below). This may be functionally executed, for example, by any one of popularity estimators 143, 145, 147 of FIG. 8. The piece of data content may be stored within a particular cache location (such as within cache network 160 of FIG. 8), or referenced from another location (such as from content provider 150 of FIG. 8). At step 920, cache management is performed according to the predicted popularity of the data content item. For example, the relative popularity of a piece of data content may determine whether the piece of data content is physically moved (or deleted) between physical cache locations (such as individual caches 162, 164, 166, for example), or whether references to pieces of data content should be re-arranged (between registers 142, 144, 146, for example). This will be described in further detail below.

Regarding to step 910, ELM is a branch of machine learning techniques that use a number of past observations to predict a future characteristic. For example, if given enough data, the ELM can determine a certain correlation to make a prediction from that data. Use of ELM may satisfy universal approximation ability, may be implemented in parallel, and can be trained sequentially. In certain embodiments, the ELM may comprise a single hidden-layer feedforward neural network. Also, the ELM may be trained in two steps as follows. First, hidden layer weights are randomly initialized using any continuous probability distribution. For example, a normal distribution may be selected to initialize the weights. Second, the hidden-layer output weights may be computed using a suitable algorithm, such as the Moore-Penrose generalized inverse.

Regarding step 920, in certain embodiments, cache management comprises arranging references in registers 142, 144, 146 which point to various pieces of data content in cache memories 162, 164, 166. For example, if a piece of data content referenced in FC register 142 is determined to be relatively unpopular, the reference in FC register 142 may be moved to LPC register 146 which indexes relatively unpopular data content. As another example, if a piece of data content referenced in LPC register 146 is determined to be relatively popular, its reference in LPC register 146 may be moved to MPC register 144 which indexes relatively popular data content. In some instances, references within registers 142, 144, 146 may also be deleted according to the relative popularity of their associated data content. In this way, references within each of FC register 142, MPC register 144, and LPC register 146 may be re-arranged or shuffled according to the relative popularity of their associated data content, so that each register 142, 144, 146 may be accordingly updated and maintained.

Still regarding step 920, in certain embodiments, cache management comprises moving pieces of data content between physical cache locations. As an illustrative example referring to FIG. 8, suppose cache 162 is physically farthest from user devices, and reserved for storage of relatively unpopular data content, cache 166 is physically closest to user devices, and reserved for storage of relatively popular data content, and cache 164 is logically between caches 162, 166. If for example, a piece of data content item within a cache 164 is determined to be relatively unpopular, it may be moved to cache 162 for storage of relatively unpopular data content. If alternatively the same piece of data content is determined to be relatively popular, it may be moved to cache 166 to reduce latency time if subsequently requested by a user device. If a piece of data content in cache 162 is determined to be the relatively most unpopular piece of data content within cache network 160, for example, it may be simply deleted from the cache network 160. In this way, data content within cache memories 162, 164, 166 can be organized in a way that would improve performance and reduce latency upon requests for various data content.

In certain embodiments (not shown), method 900 may be deployed onto an individual cache memory (for example, any of cache memories 162, 164, 166) for managing its respective memory slots based on predicted popularity of data content. In addition, method 900 may be deployed the content provider 150 servers, as shown in FIGS. 1 and 8, for example. The content provider 150 may then, for example, determine popularity of a requested piece of data content, and attach it to the data content upon delivery to the CCFM 140; this may assist the CCFM 140 in making a cache management decision.

Figure 10A:
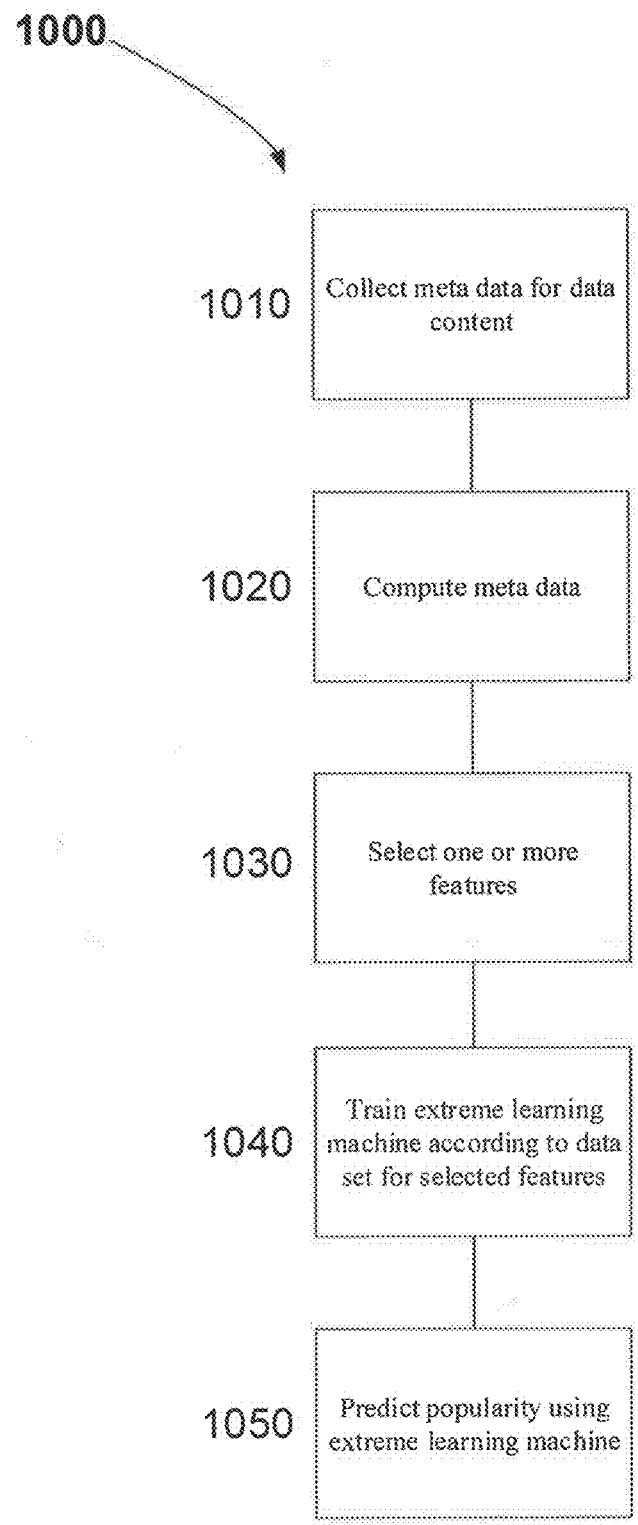
FIG. 10A is a flow chart illustrating an extreme learning machine method for predicting popularity of a piece of data content, according to an embodiment.
Figure 10B:
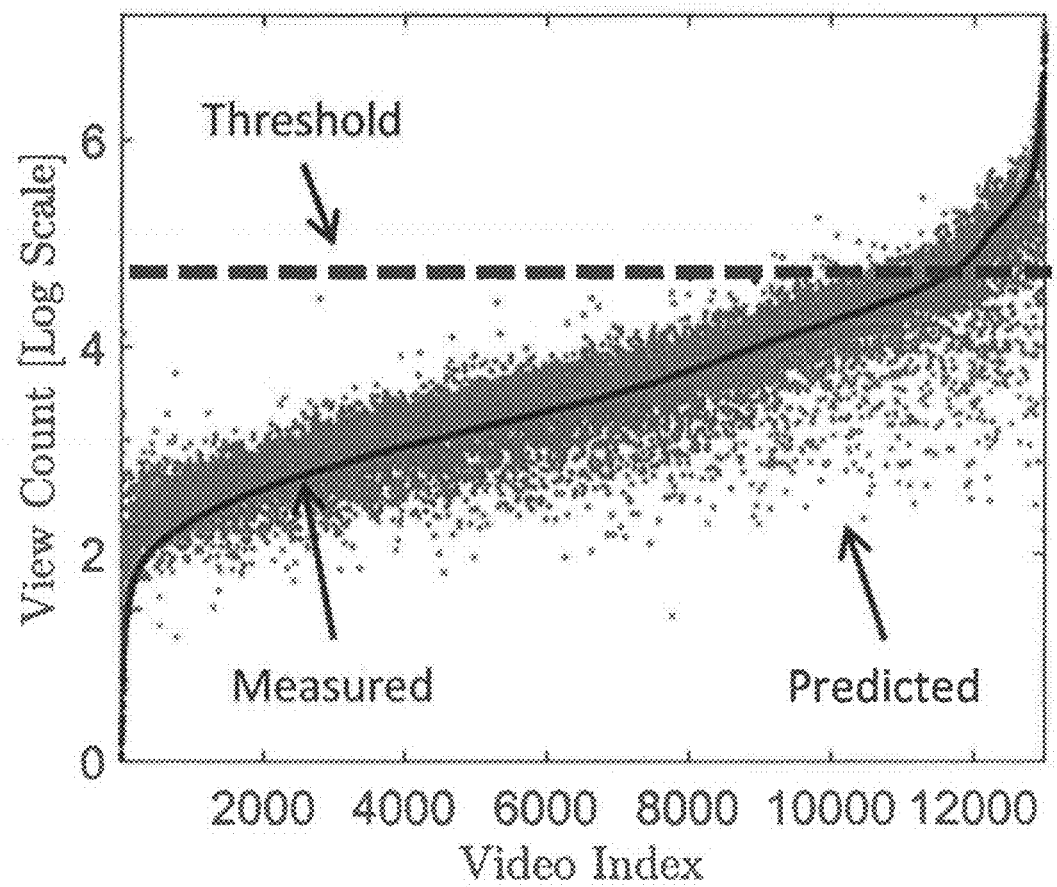
FIG. 10B is a view count graph which illustrates classification of data content as popular or unpopular, according to an embodiment.

Referring to FIG. 10A, there is shown an ELM method 1000 for predicting popularity of a piece of data content, according to an embodiment. Step 910 of FIG. 9, for example, may comprise Method 1000 in certain embodiments. At step 1010, metadata is collected for a piece of data content. Metadata is information which relates to certain features of the data content, for example, titles, thumbnails (for videos or images), keywords, and so forth. When the data content is a video for example, metadata may also include video quality (for example standard definition or high definition, video resolution, frame rate), directors, actors, actresses, production year, awards, producer, or other relevant information associated with the video. When the data content is news, metadata may include time and date, geographical locations, names of reporters, names of photographers, related events, or other relevant information associated with the news. Metadata may be collected for a predetermined period sufficient to compile a dataset relating to the data content. At step 1020, the metadata is computed, for example to provide a numerical parameter. As an example, for title or keyword information, the number of hits for that title/keyword may be computed; for a thumbnail image, a visual characteristic such as contrast or hue may be computed; and for an image, certain features may be converted into a numerical parameter. This step may utilize feature engineering based on domain knowledge of a particular situation. At step 1030, one or more features are selected from the computed metadata. For example, the metadata may relate to features such as title, keyword, or thumbnails. In some embodiments, those features which may be important for popularity prediction can be selected in order to provide more accurate popularity results. In some embodiments, view counts and past statistics may also be included. In certain embodiments, step 1030 may be performed via a feature selection algorithm which can be used to select metalevel features that may be important for prediction. At step 1040, the extreme learning machine is trained using the selected features. Finally, at step 1050, popularity of the piece of data content is predicted using the trained ELM. For example, a binary classifier based on the thresholding the popularity prediction from the extreme learning machine may be used. As an example, consider application of the feature selection algorithm (pseudo code shown below) and the extreme learning machine for predicting a future viewcount of a cache memory infrastracuture containing approximately 12,000 videos. FIG. 10B illustrates how the data content can be classified into popular and unpopular categories (i.e. a binary classifier).

Regarding step 1010, the metadata may be collected from a metadata interface module (not shown) communicatively coupled between the CCFM 140 and service provider 150 of FIG. 8. The metadata interface module is configured to retrieve the metadata associated with each requested piece of data content from the service provider 150, and provide it to the CCFM 140. In some embodiments, the metadata may be attached to each associated piece of data content, and delivered directly from the service provider 150 to the CCFM 140 upon a request from a user device.

As highlighted above, step 1030 may be carried out via a feature selection algorithm according to certain embodiments. A feature selection algorithm allows for identification of the most, or relatively more important features from the meta data, that are used to subsequently train the ELM. For example, from a group of 59 video attributes, 3 may be selected to reduce computational time and cost for training the ELM. In some embodiments, the feature selection algorithm may comprise a sequential wrapper feature selection algorithm to perform step 1030, such as that shown below for example:

Step 0: Collect the dataset $\mathcal{D}=\{(x_1,y_i)\}_{i=1}^{N}$ of features $x_i \in \mathbb{R}^m$ and video view count $y_i$ for videos $i\in\{1, 2, \ldots, N\}$. Select the desired similarity metric $F(\bullet)$ (e.g. $R^2$ coefficient of determination, Kolmogorov-Smimov test).

Step 1: Train the ELM (39) using the dataset $\mathcal{D}$ and (40). Denote the predicted viewcount from the ELM by $\hat{v}_\mathcal{D}$.

Step 2: For $j\in\{1, 2, \ldots, m\}$, train the ELM using the dataset $\mathcal{D}^j$ where $\mathcal{D}^j$ is the dataset $\mathcal{D}$ with the meta-level feature $x_i(j)$ held at its mean for all i. Denote the predicted output from each of the $j\in\{1, 2, \ldots, m\}$ ELMs by $\hat{v}_\mathcal{D}^j$.

Step 3: Compute the feature index j with maximum similarity between $\hat{v}_\mathcal{D}$ from Step 1 and $\hat{v}_\mathcal{D}^j$ from Step 2:

$$j^* \in \underset{j\in\{1,\ldots,m\}}{\mathrm{argmax}} \{F(\hat{v}_D, \hat{v}_D^j)\}$$

where $F(\bullet)$ denotes the selected similarity metric from Step 0.

Step 4: Compute the metrics of performance (Type-I and Type-II error probabilities) using the ELM trained using the dataset $\mathcal{D}^*$ where the meta-level feature j* from Step 3 has been removed. If the metrics of performance are too high then stop. Otherwise return to Step 1 using the dataset $\mathcal{D} \leftarrow \mathcal{D}^*$.

In alternative embodiments, the feature selection algorithm may comprise a Stochastic Gradient algorithm for feature selection, which relies on computing the optimal features based on model sensitivity to variations in the features and an estimate of generalization of error of the model. An exemplary Stochastic Gradient algorithm is shown below, that may be used to perform step 1030:

Initialization: Given the training set $\mathcal{D}=\{(x_i,y_i):i\in\{1, 2, \ldots, N\}\}$ where $x_i \in R^m$, compute the generalized error $\epsilon_0$ (8) for the m features.

Step 1: Estimate the model sensitivities for all features used to train the model. The model sensitivities $S_k$ for each feature k are estimated by:

$$S_k = \sum_{i=1}^{N}\left[\frac{\partial y_i}{\partial x_i(k)}\right]^2$$

$$= \sum_{i=1}^{N}\left[\sum_{j=1}^{L}\beta_j\frac{\partial h_j(x_i;\theta_j)}{\partial x_i(k)}\right]^2,$$

where the parameters are defined below (1).

Step 2: Given the feature sensitivities from (9), remove the feature with the smallest sensitivity.

Step 3: Given the subset of features from Step 2, compute the generalization error $\epsilon_i$ (8) where i denotes the total number of features removed.

Step 4: If i<m return to Step 1, else select the feature subset which gives the lowest generalization error.

Figure 11A:
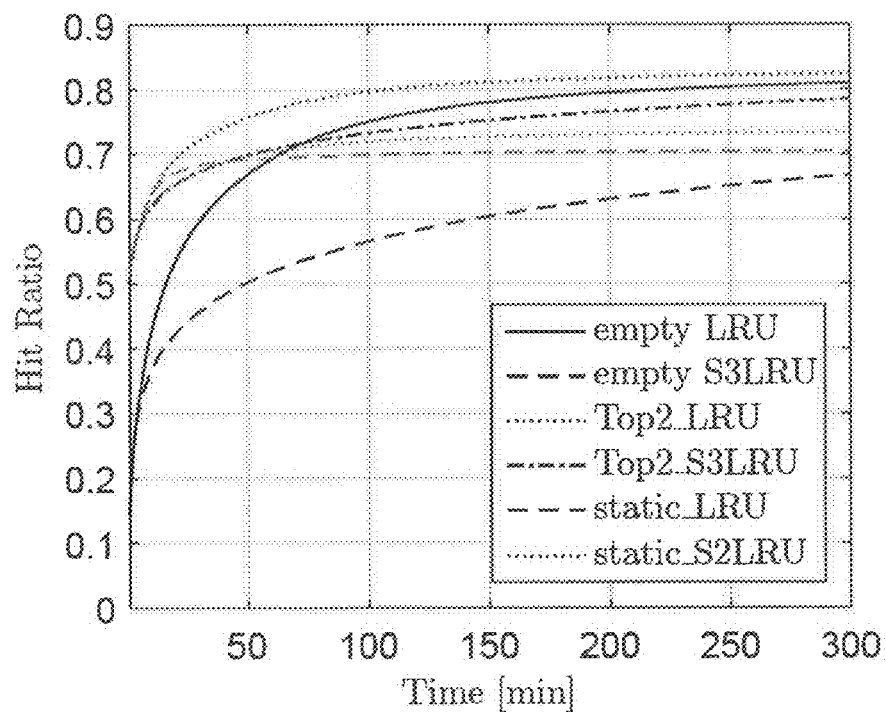
FIG. 11A is a graph illustrating the simulated hit ratio for requested data content using the method 900 of FIG. 9 on the communications network 400 of FIG. 4A, according to an embodiment.
Figure 11B:
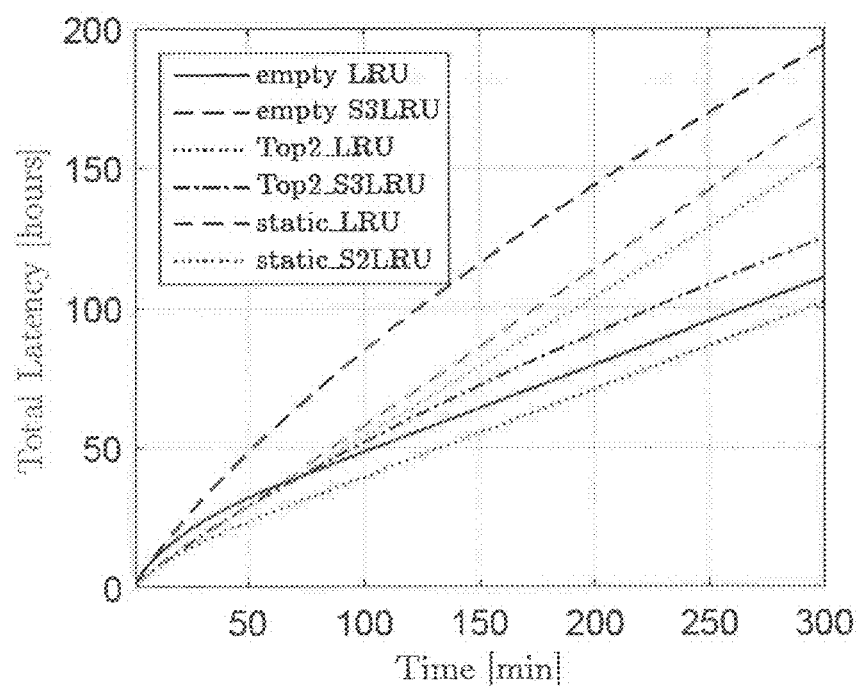
FIG. 11B is a graph illustrating the simulated latency for requested data content using the method 900 of FIG. 9 on the communications network 400 of FIG. 4A, according to an embodiment.

Referring to FIGS. 11A-B, there are shown respective hit ratio and latency simulations in response to various requests, using the cache memory infrastructure management method 900 of FIG. 9, simulated on the communications network 400 of FIG. 4A, according to an embodiment.

In certain embodiments, the performance of the ELM method 1000 for predicting popularity of a piece of data content, may be estimated, for example, according the following pseudo code:

- Initialization;
  - Initialize cache of server i at time slot t = 1 i.e., $S_i(i = 1)$ according to the cache initialization algorithm where i = 1,2, ... , |X|.
  - Get $d_{ij}$ from ndnSIM
  - T= number of time slots in the simulation.
  - Q= number of requests at a time slot.
- Operation:
  for t = 2,3, , ... , T do
    for i = 1,2, , ... , |X| do
      for j = 1,2, , ... , Q do
        Generate a random request q using inverse CDF of server i
        Calculate cache hit/miss and latency
        new contents= [q new contents]
      end for
      $S_i(t)$=cache replacement(new contents, $S_i(t - 1)$)
    end for
  end for The cache initialization portion of the pseudo code controls the user defined portion of the cache dedicated to popular content, and that controlled by request statistics methods such as Least Recently Used (LRU) or Segmented Least Recently Used (SLRU) algorithms. The parameter d_{ij} in the content distribution simulator is the associated latency between servers i and j (e.g. nodes or cache memories). The latency is computed using an ndnSIM simulator package using the following method: First define the link capacities on all the servers. Then a BestRoute (in ndnSIM) forwarding strategy is defined on all the servers to handle the incoming and outgoing packets (e.g. pieces of data content). To estimate the latency between servers i and j, content requests are generated, for example based on a logged YouTube™ dataset. An ndnSIM AppDelayTracer is then used to compute the associated delay between sending content from server i to server j. This process is repeated for all servers in the content distribution network. The hit ratio and latency results are computed via the following equations:

$$H(Q) = \sum_{q=1}^{Q}\frac{1}{|I|}\sum_{i=1}^{|I|}\left\{\frac{1_i(q)}{q}\right\} \quad L(Q) = \sum_{q=1}^{Q}\frac{1}{|I|}\sum_{i=1}^{|I|}\left\{\sum_{q\notin S}d_{ij}(q)\right\} \quad (8)$$

As shown in FIGS. 11A-B, use of the ELM improves the hit ratio probability, while it also reduces latency time when delivering a requested piece of data content. In the hit ratio graph shown in FIG. 11A, six possible caching strategies are applied (for example, to cache memories in communications network 400 of FIG. 4), four of which use the predicted popularity values from the extreme learning machine method 1000 above. Note the cache is assumed to contain 3 portions each of which can store a collection of files. First is the (empty LRU) in which the cache begins with no cached content (i.e. an empty cache). As requests are received the requested data content are cached via the least recently used method. Second is the (empty S3LRU) in which the cache begins with no cached content. As requests are received the requested data content are cached via the segmented least recently used method with 3 segments. Third is the (Top 2 LRU) in which the top two portions of the cache are populated with data content that is predicted to be popular according to the extreme learning machine method 1000 above. As requests are received, the cache content is updated via the least recently used method. Fourth is the (Top2 S3LRU) in which the top two portions of the cache are populated with data content predecited to be popular from the extreme learning machine method 1000 above. As requests are received the cache is updated using the segmented least recently used method with 3 segments. Fifth is the (static LRU) in which the top two portions of the cache are populated with data content predicted to be popular from the extreme learning machine method 1000 above. As requests are received, only the bottom portion of the cache is updated via the least recently used method. Sixth is the (static S2LRU) in which the first portion of the cache is populated with the data content predicted to be popular from the extreme learning machine method 1000 above. As requests are received, the other two portions of the cache are updated via the segmented least recently used method with two segments. As seen, the optimal hit ratio is obtained using (Top2 LRU). The same setup is used for FIG. 11B, where we see that the optimal setup is also obtained from the (Top2 LRU).

Figure 12:
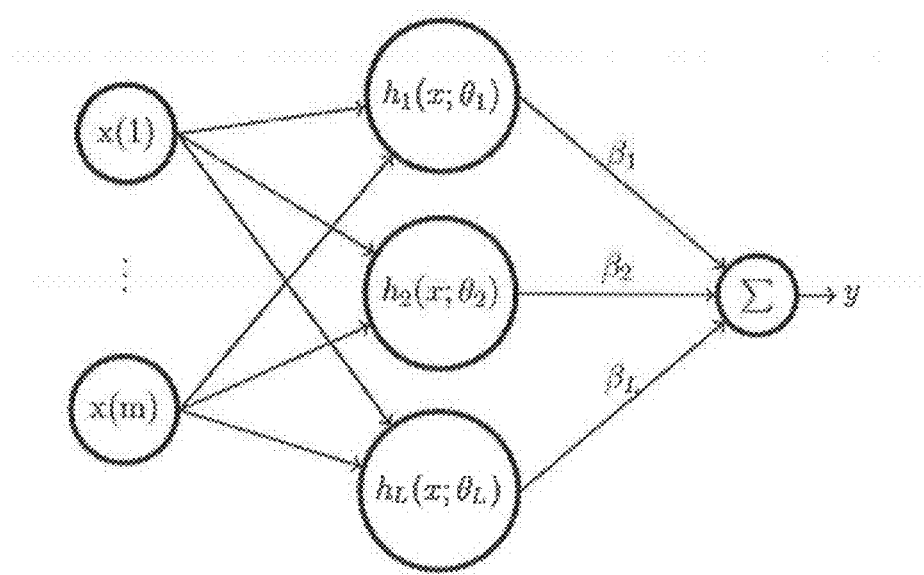
FIG. 12 is an embodiment of an ELM comprising a hidden-layer feed-forward neural network.

Referring to FIG. 12, there is shown an embodiment of an ELM comprising a hidden-layer feed-forward neural network, with $x \in R_m$ denoting the feature inputs, $h_k(x;\theta_k)$ the transfer function for hidden-layer node k, $B_k$ the output weights, and $y \in R$ the output. The parameters of the hidden-layer may be randomly generated by a distribution, and the subsequent output weights are computed by minimizing the error between the computed output y and the measured output from the dataset D (for example, a dataset D={$(x_i, y_i)\}_{i=1}^N$ of features $x \in R^m$ and total views y for content $i \in \{1, 2, \ldots N\}$) to construct a model that relates the features x to the total views y based on the dataset D, in predicting popularity of a piece of data content with the use of request statistics (e.g. for requests for data content). Each hidden-layer neuron can have a unique transfer function, such as sigmoid, hyperbolic tangent, Gaussian, or any non-linear piecewise function. Accordingly, the ELM in FIG. 13 approximates the functional relationship:

$$f(x) = \sum_{k=1}^{L} \beta_k h_k(x; \theta_k) = h(x)\beta' \qquad (9)$$

with $\beta=[\beta_1, \beta_2 \ldots, \beta_L]$ and $h(x)=[h_1(x), h_2(x), \ldots, h_L(x)]$, wherein $\theta$ represents the model parameters of the ELM.

In some embodiments, the ELM may include tuning the model parameters $\theta$ in equation 9 to improve accuracy/efficiency of the ELM. In other words, ELM method 1000 in FIG. 10A may include an optional step 1045 (not shown) of tuning the extreme learning machine model parameters with an adaptive algorithm to reduce error probabilities. The adaptive algorithm may be used to select $\theta$ to reduce the probability of Type-I and Type II errors in predicted popularity of a piece of data content using the ELM. A Type-I error relates to the erroneous prediction of an unpopular piece of data content as popular (e.g. 'false positive'), while a Type-II error relates to the erroneous prediction of a popular piece of data content as unpopular (e.g. 'false negative'). When applied to CCFM 140 of FIG. 8, for example, this may result in the shifting of references from the LPC register 146 to the MCP register 144 for a Type-I error, and the shifting of references from the MCP register 144 to the LPC register 146 for a Type-II error.

The adaptive algorithm, may comprise a simulation based stochastic optimization problem to estimate:

$$\operatorname*{argmin}_{\theta \in \mathbb{R}^{L \times 2}} J(\theta) = \mathbb{E}[\mathbb{P}(\text{Type-I error}) + \mathbb{P}(\text{Type-II error})] \qquad (10)$$

where $\mathbb{E}$ denotes the expectation with respect to the random variable defined in (9), and $\mathbb{P}$ denotes the probability. To determine a local minimum value of $J(\theta)$, the following simultaneous perturbation stochastic gradient (SPSA) algorithm may be used: STEP 1: Choose initial ELM parameters $\theta_0$ by generating each from the distribution N(0,1), and STEP 2: for iterations k=1, 2, 3, . . . , estimate cost $J_{(k)}$ in (10), denoted as $J_k(\theta_k)$, by plugging:

$$\mathbb{P}(\text{Type-I error}) \approx FP/(TP+FN) \qquad (11)$$
$$\mathbb{P}(\text{Type-II error}) \approx FN/(TN+FP)$$
where $$FP = \sum_{i=1}^{N} 1\{\operatorname{sign}(f(x_i;\theta_k)) \neq y_i \wedge y_i = 1\}, \qquad (12)$$

$$TP = \sum_{i=1}^{N} 1\{\operatorname{sign}(f(x_i;\theta_k)) = y_i \wedge y_i = 1\},$$

$$FN = \sum_{i=1}^{N} 1\{\operatorname{sign}(f(x_i;\theta_k)) \neq y_i \wedge y_i = -1\},$$

$$TN = \sum_{i=1}^{N} 1\{\operatorname{sign}(f(x_i;\theta_k)) = y_i \wedge y_i = -1\},$$

into equation (9). Then, the following gradient estimate may be computed:

$$\hat{\nabla}_\theta \hat{J}_k(\theta_k) = \frac{\hat{J}_k(\theta_k + \Delta_k \omega) - \hat{J}_k(\theta_k - \Delta_k \omega)}{2\omega \Delta_k} \qquad (13)$$

$$\Delta_k(i) = \begin{cases} -1 & \text{with probability } 0.5 \\ +1 & \text{with probability } 0.5 \end{cases}$$

With gradient step size $\omega>0$. Then the probe vector $\theta_k$ may be updated with step size $\mu>0$:

$$\theta_{k+1} = \theta_k - \mu \hat{\nabla}_\theta \hat{J}_k(\theta k) \qquad (14)$$

As understood by those skilled in the art, SPSA is a generalization where an explicit formula for the gradient is not available, and needs to be estimated by stochastic simulation. For decreasing step size $\mu=1/k$, the SPSA algorithm converges with probability one to a local stationary point. For constant step size, it converges weakly (in probability) to a local stationary point.

In certain embodiments, ELM method 1000 of FIG. 10A may further comprise an optional step (not shown) for handling unbalanced training data and mitigating outliers in the data set. For example, the computed meta data in step 1020 forms a data set formed from past observations, which may be considered 'unbalanced' in that it may only include a few requests for popular data content. Additionally, the data set may include outliers which are inconsistent with the remainder of the data set. The following is an exemplary protocol which outlines the optional step that may be used in method 1000 of FIG. 10A for handling unbalanced training data and to reduce the effect of outliers, according to certain embodiments:

Step 1: Given the training set $\mathcal{D}=\{(x_i,y_i):i\in\{1, 2, \ldots, N\}\}$, and the number of hidden-layer L, compute the optimal value of the weighting matrix W by solving:

$$W^* \in \underset{W\in\mathbb{R}_+}{\mathrm{argmax}}\{F(X, Y, W)\}$$

where F(X,Y,W) is the performance measure from Sec.2.4 (i.e. accuracy, sensitivity, specificity, F-measure, MCC, G-mean, Kappa) for an ELM model trained by optimizing:

$$\beta^* \in \underset{\beta\in\mathbb{R}_+^L}{\mathrm{argmin}}\left\{\frac{1}{2}\|\beta\|_2^2 + \frac{1}{2}\|W(H(X)\beta - Y)\|_2^2\right\}.$$

The solution to the above optimization problem is given by $\beta^*=(H^TWH)^{-1}H^TWY$. Note that the signal matrix $W\in\mathbb{R}^{L\times L}$ only contains two unique values, the first is the weight for the majority class and the other is the weight for the minority class. Since the objective function in (10) is measured in noise, we utilize the SPSA algorithm (5) to estimates W* (11).

Step 2: Given the weight matrix W from Step 1, compute the optimal value of the regularization constant C by solving:

$$C^* \in \underset{C\in\mathbb{R}_+}{\mathrm{argmax}}\{F(X, Y, C)\}$$

where F(X,Y,C) is the performance measure from Sec.2.4 (i.e. accuracy, sensitivity, specificity, F-measure, MCC, G-mean, Kappa) for an ELM model trained by optimizing:

$$\beta^* \in \underset{\beta\in\mathbb{R}_+^L}{\mathrm{argmin}}\left\{\frac{1}{2}\|\beta\|_2^2 + \frac{1}{2}C\|W(H(X)\beta - Y)\|_2^2\right\}.$$

The solution to the above optimization problem is given by $\beta^*=(1/C+H^TWH)^{-1}H^TWY$. Since the objective function in (11) is measured in noise, we utilize the SPSA algorithm to estimate C* (11).

Step 3: D, L, C, and W compute the mean square error associated with each sample $\epsilon\mathbb{R}^N$ where $n(i)=\|h(x_i)\beta'-y_i\|_2^2$.

Step 4: Select the number of features K to be tested as being and outlier. A feature $i\in\{1, 2\ldots, K\}$ is an outlier if the removal of i causes a negligible change in $\epsilon(8)$.

Referring to the above protocol, in Step 1, the weights associated with the minority and majority classes are selected. In Step 2, the regularization constant C is selected. The regularization constant C in determines the tradeoff between the minimization of training errors and the output weights β (i.e. maximization of the marginal distance). Additionally, notice that β is the solution of the minimization of the objective function for constant C. It has been noted that including the regularization constant C increases the stability of the ELM and also enhances the generalization ability. Finally, Steps 3 and 4 estimate which training features are outliers and remove them from the training set.

Figure 13:
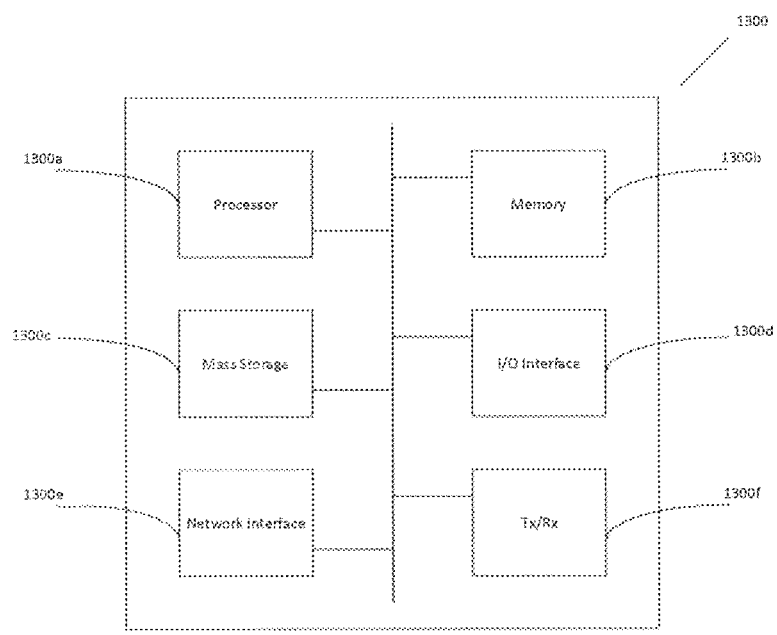
FIG. 13 is a schematic diagram of a hardware device, according to an embodiment.

Referring to FIG. 13, there is shown a schematic diagram of a hardware device 1300 which may comprise the management device in certain embodiments, or upon which various functional modules, such as CCFM 140 may be deployed. As shown, the hardware device 1300 includes a processor 1300a, memory 1300b, non-transitory mass storage 1300c, I/O interface 1300d, network interface 1300e, and a transceiver 1300f, all of which are communicatively coupled via bi-directional bus. According to certain embodiments, any or all of the depicted elements may be utilized, or only a subset of the elements. Further, hardware component 1300 may contain multiple instances of certain elements, such as multiple processors, memories, or transceivers. Also, elements of hardware component 1300 may be directly coupled to other elements without the bi-directional bus.

The I/O interface 1300d, and/or transceiver 1300f may be implemented to receive requests from recipient nodes, receive indications and/or data from transmitting nodes, and transmit data to recipient nodes, according to different RAN configurations having wired or wireless links between nodes. The network interface 1300e may be used to communicate with other devices or networks (not shown) in determining forwarding, protocol, and other data delivery decisions to facilitate data transmission between nodes.

The memory 1300b may include any type of non-transitory memory such as static random access memory (SRAM), dynamic random access memory (DRAM), synchronous DRAM (SDRAM), read-only memory (ROM), any combination of such, or the like. The mass storage element 1300c may include any type of non-transitory storage device, such as a solid state drive, hard disk drive, a magnetic disk drive, an optical disk drive, USB drive, or any computer program product configured to store data and machine executable program code. According to certain embodiments, the memory 1300b or mass storage 1300c may have recorded thereon statements and instructions executable by the processor 1300a for performing the aforementioned functions and steps of the hardware device 1300.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for managing a cache memory network comprising, by a caching, computing and forwarding management (CCFM) networked computing device:
   estimating the popularity of a piece of data content according to operation of an extreme learning machine operated using the CCFM networked computing device, wherein operation of the extreme learning machine comprises the steps of:
      collecting metadata associated with the piece of data content, the metadata including content features of the piece of data content;
      computing the collected metadata;
      selecting one or more features from the computed metadata; and
      training the extreme learning machine according to selected one or more features, wherein the popularity of a piece of data content is estimated according to the trained extreme learning machine; and
   managing the cache memory network according to the estimated popularity of the piece of data content,
   wherein the CCFM comprises a plurality of content registers, and
   wherein managing the cache memory network comprises (i) indexing a reference to the piece of data content in one of the plurality of content registers, or (ii) caching or maintaining the piece of data content in a cache location in the cache memory network, or (iii) both (i) and (ii).

2. The method of claim 1 wherein the plurality of content registers comprises a first register for indexing relatively popular data content, wherein when the piece of data content is estimated to be popular, managing the cache memory comprises moving a reference to the piece of data content to the first register.

3. The method of claim 1 wherein the plurality of content registers comprises a second register for indexing relatively unpopular data content, wherein when the piece of data content is estimated to be unpopular, managing the cache memory comprises providing a reference to the piece of data content to the second register.

4. The method of claim 1 wherein the plurality of content registers comprises a third register for indexing data content in the cache memory network, wherein when the piece of data content is estimated to be unpopular, managing the cache memory comprises deleting a reference to the piece of data content from the third register.

5. The method of claim 1 wherein the cache memory network comprises a first cache location relatively farther from a user device, and a second cache location relatively closer to the user device, wherein when the piece of data content is estimated to be popular, managing the cache memory comprises caching the piece of data content in the second cache location.

6. The method of claim 1 wherein the cache memory network comprises a first cache location relatively farther from a user device, and a second cache location relatively closer to the user device, wherein when the piece of data content is estimated to be unpopular, managing the cache memory comprises caching the piece of data content in the first cache location.

7. The method of claim 1 wherein the piece of data content is stored within a cache location of the cache memory network, wherein when the piece of data content is estimated to be unpopular, managing the cache memory comprises deleting the piece of data content from the cache location.

8. The method of claim 1 wherein estimating the popularity of the piece of data content by the trained extreme learning machine comprises classifying the piece of data content into a popular or an unpopular category.

9. The method of claim 1 wherein the step of selecting one or more features is performed according to a feature selection algorithm.

10. The method of claim 9 wherein the feature selection algorithm comprises a sequential wrapper feature selection algorithm, or a stochastic gradient algorithm.

11. The method of claim 1 wherein the popularity of the piece of data content is estimated in response to a request for the piece of data content from a user device.

12. A management device for managing a cache memory network, the management device comprising:
   a processor;
   a plurality of registers for indexing references to data content;
   an output interface coupled to the processor, the output interface for communicatively coupling to the cache memory network; and
   a memory coupled to the processor and having stored thereon machine readable code which when executed by the processor estimates the popularity of a piece of data content according to operation of an extreme learning machine operated using the management device, and manages the cache memory network according to the estimated popularity of the piece of data content through the output interface,
      wherein, operation of the extreme learning machine comprises the steps of:
   collecting metadata associated with the piece of data content, the metadata including content features of the piece of data content;
   computing the collected metadata;
   selecting one or more features from the computed metadata; and
   training the extreme learning machine according to selected one or more features, wherein the popularity of a piece of data content is estimated according to the trained extreme learning machine; and
   wherein managing the cache memory network comprises (i) indexing a reference to the piece of data content in one of the plurality of content registers, or (ii) caching or maintaining the piece of data content in a cache location in the cache memory network, or (iii) both (i) and (ii).

13. The management device of claim 12, wherein the plurality of registers comprises a first register for indexing relatively popular data content, wherein when the piece of data content is estimated to be popular, the management device provides a reference to the piece of data content to the first register.

14. The management device of claim 12, wherein the plurality of registers comprises a second register for indexing relatively unpopular data content, wherein when the piece of data content is estimated to be unpopular, the management device provides a reference to the piece of data content to the second register.

15. The management device of claim 12, wherein the plurality of registers comprises a third register for indexing data content in the cache memory network, wherein when the piece of data content is estimated to be unpopular, the management device deletes a reference to the piece of data content from the third register.

16. The management device of claim 12, wherein when the piece of data content is estimated to be popular, the management device is configured to cache the piece of data content in a second cache location of the cache memory network that is relatively closer to a user device than a first cache location of the cache memory network.

17. The management device of claim 12, wherein when the piece of data content is estimated to be unpopular, the management device is configured to cache the piece of data content in a first cache location of the cache memory network that is relatively farther from a user device than a second cache location of the cache memory network.

18. The management device of claim 12, wherein when the piece of data content is estimated to be unpopular, the management device is configured to delete the piece of data content from the cache memory network.

19. The management device of claim 12 wherein estimating the popularity of the piece of data content by the trained extreme learning machine comprises classifying the piece of data content into a popular or an unpopular category.

20. A non-transitory computer readable memory having recorded thereon statements and instructions for execution by a processor in a caching, computing and forwarding management (CCFM) networked computing device, the statements and instructions comprising:
   estimating the popularity of a piece of data content according to operation of an extreme learning machine operated using the CCFM networked computing device, wherein operation of the extreme learning machine comprises the steps of:
      collecting metadata associated with the piece of data content, the metadata including content features of the piece of data content;
      computing the collected metadata;
      selecting one or more features from the computed metadata; and
      training the extreme learning machine according to selected one or more features, wherein the popularity of a piece of data content is estimated according to the trained extreme learning machine; and
   managing a cache memory network according to the estimated popularity of the piece of data content,
wherein managing the cache memory network comprises (i) indexing a reference to the piece of data content in one of the plurality of content registers, or (ii) caching or maintaining the piece of data content in a cache location in the cache memory network, or (iii) both (i) and (ii).

21. The method of claim 1, wherein operation of the extreme learning machine additionally comprises tuning model parameters of the extreme learning machine with an adaptive algorithm to reduce error probabilities.

22. The management device of claim 12, wherein operation of the extreme learning machine additionally comprises tuning model parameters of the extreme learning machine with an adaptive algorithm to reduce error probabilities.

* * * * *

UNITED STATES PATENT AND TRADEMARK OFFICE
CERTIFICATE OF CORRECTION

PATENT NO.         : 10,057,367 B2
APPLICATION NO.    : 15/059013
DATED              : August 21, 2018
INVENTOR(S)        : William August Hoiles et al.

Page 1 of 1

It is certified that error appears in the above-identified patent and that said Letters Patent is hereby corrected as shown below:

In the Specification

Column 15, Line 9 "the ELM by $\hat{v}_\mathcal{D}$ ·" should read -- ELM by $\hat{v}_\mathcal{D}$ · --

Column 15, Line 14 "ELMS by $\hat{v}_\mathcal{D}^j$ ·" should read -- ELMs by $\hat{v}_\mathcal{D}^j$ · --

Column 15, Line 16 "similarity between $\hat{v}_\mathcal{D}$ from Step 1 and $\hat{v}_\mathcal{D}^j$ from Step" should read -- similarity between $\hat{v}_\mathcal{D}$ from Step 1 and $\hat{v}_\mathcal{D}^j$ from Step --

Signed and Sealed this
Eleventh Day of December, 2018

Andrei Iancu
*Director of the United States Patent and Trademark Office*